(12) United States Patent
Bai

(10) Patent No.: US 12,077,720 B2
(45) Date of Patent: Sep. 3, 2024

(54) PROCESS FOR PRODUCING SOLID BIOMASS FUEL

(71) Applicant: Hong Mei Bai, Hong Kong (CN)

(72) Inventor: Hong Mei Bai, Hong Kong (CN)

(\*) Notice: Subject to any disclaimer, the term of this patent is extended or adjusted under 35 U.S.C. 154(b) by 38 days.

(21) Appl. No.: 17/268,242

(22) PCT Filed: Jul. 22, 2020

(86) PCT No.: PCT/GB2020/051748
§ 371 (c)(1),
(2) Date: Sep. 20, 2021

(87) PCT Pub. No.: WO2021/014151
PCT Pub. Date: Jan. 28, 2021

(65) Prior Publication Data
US 2021/0332305 A1   Oct. 28, 2021

(30) Foreign Application Priority Data

Jul. 22, 2019  (GB) ...................................... 1910470
Aug. 9, 2019  (GB) ...................................... 1911448

(51) Int. Cl.
*C10L 5/44*  (2006.01)
*C10L 5/06*  (2006.01)
*C10L 5/36*  (2006.01)
*C10L 9/08*  (2006.01)

(52) U.S. Cl.
CPC .................. *C10L 5/445* (2013.01); *C10L 5/06* (2013.01); *C10L 5/363* (2013.01); *C10L 5/442* (2013.01); *C10L 9/083* (2013.01); *C10L 2200/0469* (2013.01); *C10L 2250/06* (2013.01); *C10L 2290/06* (2013.01); *C10L 2290/24* (2013.01);

(Continued)

(58) Field of Classification Search
CPC .. C10L 5/445; C10L 5/06; C10L 5/363; C10L 5/442; C10L 9/083; C10L 2200/0469; C10L 2250/06; C10L 2290/06; C10L 2290/24; C10L 2290/28; C10L 2290/30; C10L 2290/32; C10L 2290/58; C10L 5/44; C10L 5/447; Y02E 50/10; Y02E 50/30
See application file for complete search history.

(56) References Cited

FOREIGN PATENT DOCUMENTS

| CN | 104232213 A | 12/2014 |
|---|---|---|
| CN | 104232222 A | 12/2014 |
| CN | 105349198 A | 2/2016 |

(Continued)

OTHER PUBLICATIONS

Notification of Transmittal of the International Search Report and the Written Opinion of the International Searching Authority, or the Declaration dated Oct. 28, 2020 for App. No. PCT/GB2020/051748.

(Continued)

*Primary Examiner* — Cephia D Toomer
(74) *Attorney, Agent, or Firm* — Ryan T. Grace; Advent, LLP

(57) ABSTRACT

The present invention relates to a process for producing a solid biomass fuel from rice husks either alone or in combination with other materials such as calliandra callothyrsus or wood, as well as a solid biomass fuel produced by said process. Additionally, the present invention relates to a combustion process comprising combusting said solid biomass fuel so as to produce energy.

19 Claims, 12 Drawing Sheets

(52) U.S. Cl.
CPC ....... *C10L 2290/28* (2013.01); *C10L 2290/30* (2013.01); *C10L 2290/32* (2013.01)

(56) References Cited

FOREIGN PATENT DOCUMENTS

| | | | |
|---|---|---|---|
| CN | 105349200 A | | 2/2016 |
| CN | 105602646 A | | 5/2016 |
| CN | 106635232 A | | 5/2017 |
| CN | 106753663 A | | 5/2017 |
| CN | 107033980 A | | 8/2017 |
| CN | 109321305 A | | 2/2019 |
| CN | 109370674 A | | 2/2019 |
| CN | 109370698 A | | 2/2019 |
| KR | 100979391 B1 | | 8/2010 |
| KR | 20130058898 | * | 6/2013 |
| KR | 20130058898 A | | 6/2013 |
| WO | 2020229824 A1 | | 11/2020 |

OTHER PUBLICATIONS

Tjutju Nurhayati et al: "Progress in the technology of energy conversion from woody biomass in Indonesia", Forestry Studies in China, Beijing Forestry University. BE, vol. 8. No. 3, Sep. 1, 2006 (Sep. 1, 2006), pp. 1-8., XP019440253, ISSN: 1008-1321 paragraph above table 1; p. 2; table 1.
UK Search Report for GB1910470.2 dated Oct. 4, 2019.
Combined Search and Examination Report for GB2208788.6, dated Jul. 28, 2022.

\* cited by examiner

The compression ratio: the ratio of the length to the diameter of the ring mold drain hole.

The compression ratio= length/diameter

PROCESS FOR PRODUCING SOLID BIOMASS FUEL

FIELD OF THE INVENTION

The present invention relates to a process for producing a solid biomass fuel, as well as a solid biomass fuel produced by said process. Additionally, the present invention relates to a combustion process comprising combusting said solid biomass fuel so as to produce energy.

BACKGROUND OF THE INVENTION

Coal-fired power generation is used in power plants and industrial processes around the world. Coal and other fossil fuels are non-renewable energy resources. Over the last few decades, there have been calls to reduce the consumption of coal in coal-fired power stations and instead to use renewable resources for energy.

Fuels derived from biomass are an example of a renewable energy source that can be used to replace or at least partially replace coal. Biomass derived fuels can be burned in the presence of oxygen in power plants in combustion processes to produce energy. Biomass derived fuels can be combusted in traditional power plants originally designed for coal combustion, or biomass derived fuels can be combusted in power plants built specifically for biomass combustion. Certain forms of biomass can be mixed with coal and combusted in the same combustion process within a power plant. Such a process is known as coal co-firing of biomass. To be suitable for co-firing with coal, biomass derived fuel must typically have certain properties such as a certain level of quality and homogeneity with regard to properties. For example, biomass fuel comprised of particles of a homogenous size, density, moisture content etc. are particularly desirable in co-firing processes. It is also desirable that the biomass fuel contains a low level of ash. Levels of ash in biomass derived fuels are typically higher than those found in coal.

Various processes for producing solid biomass fuels from biomass sources are known. WO2014/087949 discloses a process for producing a solid biomass fuel in which a source of biomass is steam exploded before being molded into biomass blocks which are then heated so as to form the biomass fuel. The aim of the process is to produce biomass fuel with sufficient handleability during storage and with reduced chemical oxygen demand (COD) in discharged water during storage. The biomass source used in the process is palm kernel shell.

WO2016/056608 builds upon the teaching of WO2014/087949, and discloses a process for manufacturing solid biomass fuel in which the steam explosion step is not required to produce the fuel. The process comprises a molding step in which a biomass source is crushed before being compressed and molded into biomass blocks, before the biomass blocks are heated. The biomass source taught for use in said process is trees such as douglas fir, hemlock, cedar, cypress, European red pine, almond old tree, almond shell, acacia xylem part, acacia bark, walnut shell, sago palm, empty fruit bunches, meranti and rubber.

WO2017/175733 discloses a similar process comprising a molding step in which a biomass source is crushed before being compressed and molded into biomass blocks, before the biomass blocks are heated. The process of WO2017/175733 is directed to providing biomass fuel which exhibits low disintegration and achieves reduced COD in discharged water when exposed to rain water. The source of the biomass to be used in the process is selected from the rubber tree, acacia, meranti, eucalyptus, teak and a mixture of larch, spruce and birch.

WO2019/069849 aims to provide a biomass fuel that is easy to transport and store and that is resistant to spontaneous combustion during storage. The biomass fuel is made by a process comprising a molding step in which a biomass source is crushed before being compressed and molded into biomass blocks, before the biomass blocks are heated. The biomass source for producing the fuel is selected from rubber trees, acacia trees, radiata pine, a mixture of larch, spruce and birch; and spruce, pine and fir.

WO2019/069860 discloses an apparatus for producing biomass solid fuel. The apparatus comprises a carbonisation furnace for carbonising a molded biomass product to obtain a biomass solid fuel. The apparatus further comprises a yield calculation unit, a temperature measurement unit and a control unit. The control unit controls the heat applied to the carbonisation furnace based upon the spontaneous combustion properties of the biomass fuel. The molded biomass product is formed by pulverising a biomass source into pellets, before molding said pellets into a molded biomass product. The biomass source is selected from the rubber tree, acacia, dipterocarp, radia pine, a mixture of larch, spruce and birch or a mixture of spruce, pine and firs.

WO2018/181919 discloses a different process to those discussed above for producing a solid biomass fuel. The process involves a step of hydrothermal carbonisation of biomass in which a biomass source is pressurised in hot water so as to carbonise the biomass. The process is reported to provide a biomass fuel with high grindability in high yield and with reduced manufacturing costs. The source of the biomass is selected from husks, palm kernel shell, coconut palm, bamboo, empty fruit bunches, apricots and aubergines.

WO2017/175737 discloses a cooling apparatus for cooling carbonised biomass. The apparatus improves the cooling efficiency of semi-carbonised molded biomass. The apparatus cools the biomass by spraying water thereon. The cooler comprises a vibration flat plate and a spraying section for spraying water on the flat plate. The biomass fuel is produced by the same processes as discussed above. The source of biomass for producing the biomass fuel is douglas fir, hemlock, cedar, cypress, European red pine, almond old tree, almond shell, acacia xylem part, acacia bark, walnut shell, sago palm, empty fruit bunches, meranti and the rubber tree.

Finally, WO2014/050964 discloses a process for improving the grindability of biomass such that it can be ground with coal. The process involves increasing the moisture content of ground wood biomass to between 10 to 50%; densifying the biomass to have a density of 0.55 g/cm$^3$ or higher, before subjecting the biomass to torrefaction. The source of biomass includes wood chips, bark, wood shavings, and sawdust.

The inventors of the present invention have appreciated that the solid biomass fuels and processes for their production discussed in the above documents have various problems associated with them. For example, the biomass sources described in the above documents are all plants and trees that typically only occur naturally, and that are not easy to cultivate and harvest on a commercial scale. The inventors have appreciated that it would be advantageous to have a source of biomass that can be grown and harvested easily on a commercial scale. It would also be advantageous to have a source of biomass that can be grown and harvested such that the quality and specific characteristics of the biomass source can be controlled.

Additionally, it has been found by the inventors that the sources of biomass described in the above documents, all being comprised of wood and similar materials, when subjected to conventional pulverising techniques known in the art, form particles with a low degree of homogeneity. Furthermore, pulverising the biomass sources is expensive due to the nature of the wood and wood-like material being difficult to pulverise. The inventors of the present invention have appreciated that it would be advantageous to have a source of biomass that is more easily pulverised by conventional pulverising techniques known in the art, and that forms more homogenous sized particles when pulverised, or to have a source of biomass that does not require pulverisation before conversion to a solid biomass fuel.

Additionally, it has been found by the inventors that solid biomass fuels prepared from the biomass sources discussed in the above documents and prepared by the processes in the above documents do not have sufficient water proof characteristics. Water proof characteristics are important for solid biomass fuels since they need to be dry (or at least sufficiently dry) when used in a combustion process (either on their own or when co-fired with coal). Biomass fuels are frequently exposed to moisture during storage or transportation (such as from rain water). Accordingly, biomass fuels with increased water proof capacity are desirable.

The present inventors have also appreciated that the biomass fuel production processes described in the above documents do not provide fuels with sufficient quality and uniformity. In particular, the processes discussed above do not provide sufficient control of the density of the biomass during the molding step.

SUMMARY OF THE INVENTION

The present invention addresses the problems discussed above associated with prior processes. It has been surprisingly found by the inventors of the present invention that certain sources of biomass that are useful in providing solid biomass fuels, can be grown and harvested on a commercial scale. In doing so, a fixed and constant source of biomass for the production of fuels can be provided in growth cycles. Additionally, growing and harvesting said sources of biomass on a commercial scale enables control of the quality and uniformity of the biomass source, for example by cultivation and breeding techniques.

Additionally, it has advantageously been found that certain sources of biomass do not need pulverization before processing into solid biomass fuels, thus reducing the costs associated with the process.

In addition to the above, the inventors of the present invention have also found that biomass fuels with improved waterproof characteristics can be provided by modifying the molding and/or heating steps of the process. The adaptation and control of the molding and heating steps of the process of the invention has also been found to improve the quality and uniformity of the solid biomass fuel product, as well as impart certain physical characteristics to it that are highly preferable for use in a combustion process. Furthermore, the adaptation of the molding and heating steps has been found to increase the yield of the solid biomass fuel, and impart characteristics to the fuel that make it easier to transport and store. The inventors have found that the nature of the biomass source, and the specific features of the molding and heating step act together to provide a superior biomass fuel product for use in combustion processes over those known in the art.

According to a first aspect of the invention, there is provided a process for producing a solid biomass fuel, wherein the process comprises the following steps:

(i) providing one or more biomass powders having a particle size of from 1000 μm to 10000 μm;

(ii) heating the one or more biomass powders to a temperature of from 160° C. to 420° C. for a period of from 0.25 to 5 hours to provide a heated biomass product; and (iii) molding the heated biomass product to provide a solid biomass fuel;

wherein the one or more biomass powders are derived from one or more sources of biomass, wherein the one or more sources of biomass: (i) consist of or consist essentially of rice husks; (ii) comprise or consist essentially of a mixture of rice husks and wood such as mixed wood; (iii) consist of or consist essentially of a mixture of rice husks and calliandra callothyrsus; or (iv) comprise rice husks in an amount of at least 15% by weight, and calliandra callothyrsus, and wherein if the one or more sources of biomass consists or consists essentially of rice husks, material derived from biomass is present in the solid biomass fuel in an amount of at least 95% by weight of the total fuel content of the solid biomass fuel.

In an embodiment, the one or more sources of biomass consist of, or consist essentially of rice husk.

In another embodiment, the one or more sources of biomass further comprise wood such as mixed wood, calliandra callothyrsus, or a combination thereof. Preferably, the one or more sources of biomass comprise (i) rice husk and calliandra callothyrsus, or (ii) rice husk and wood such as mixed wood. In an embodiment, the one or more sources of biomass consist of or consist essentially of a mixture of rice husks and wood such as mixed wood. In another embodiment, the one or more sources of biomass consist of or consist essentially of a mixture of rice husks and calliandra callothyrsus. In another embodiment, the one or more sources of biomass comprise rice husks in an amount of at least 15% by weight, and calliandra callothyrsus.

In an embodiment, the one or more sources of biomass comprise rice husk in an amount of from 20% to 80% by weight. In one embodiment, the one or more sources of biomass comprise rice husk in an amount of from 20% to 80% by weight, and wood such as mixed wood in an amount of from 20% to 80% by weight. Preferably, the one or more sources of biomass do not comprise coconut shell or straw. In an embodiment, the one or more sources of biomass consist essentially of rice husk and wood such as mixed wood, wherein the one or more sources of biomass comprise rice husk in an amount of from 20% to 80% by weight, and wood such as mixed wood in an amount of from 20% to 80% by weight. In another embodiment, the one or more sources of biomass comprise rice husk in an amount of from 20% to 80% by weight, and calliandra callothyrsus in an amount of from 20% to 80% by weight. In an embodiment, the one or more sources of biomass consist essentially of rice husk and calliandra callothyrsus, wherein the one or more sources of biomass comprise rice husk in an amount of from 20% to 80% by weight, and calliandra callothyrsus in an amount of from 20% to 80% by weight.

The step of heating the one or more biomass powders is preferably carried out for a time period of from 0.4 to 3 hours such as 0.4 to 2 hours, or 0.5 to 3 hours, such as 0.4 to 2 hours.

The step of heating the one or more biomass powders comprises heating the one or more biomass powders to a temperature of from 180° C. to 350° C., and preferably to a temperature of from 210° C. to 280° C.

Preferably, step (ii) of heating the one or more biomass powders comprises heating the one or more biomass powders under conditions so as to induce torrefaction of the molded biomass product.

Preferably, the process further comprises cooling the heated biomass product prior to step (iii) of molding the heated biomass product.

The step (i) of providing one or more biomass powders may comprise pulverising one or more sources of biomass, and/or mixing the one or more biomass powders.

Typically, the process may comprise a step of drying the one or more biomass powders prior to step (ii) of heating the one or more biomass powders.

The step (iii) of molding the heated biomass product may comprise adapting the molding step such that that density of the solid biomass fuel is controlled. Preferably, adapting the molding step such that the density of the solid biomass fuel is controlled comprises controlling the compression ratio of a mold used in said molding step.

Preferably, the process comprises adding an additive to the heated biomass product prior to step (iii) of molding the heated biomass product. Preferably, the additive is added so as to increase the yield of the solid biomass fuel.

Step (ii) of heating the one or more biomass powders is typically adapted so as to control the uniformity of the heated biomass product. Preferably, adapting step (ii) so as to control the uniformity of the heated biomass product comprises conducting step (ii) in an apparatus in which the one or more biomass powders are rotated whilst being heated. More preferably, adapting step (ii) so as to control the uniformity of the heated biomass product comprises controlling the speed or direction of rotation of the one or more biomass powders. Most preferably, the one or more biomass powders are rotated in the apparatus in both an anticlockwise and clockwise direction.

The bulk density of the solid biomass fuel as determined according to DIN EN 15103 is typically from 0.40 kg/l to 0.65 kg/l, preferably from 0.45 kg/l to 0.60 kg/l, and most preferably from 0.50 to 0.60 kg/l.

The mechanical durability of the solid biomass fuel as determined according to DIN EN 15210-1 is typically 95% or more, 96% or more, 97% or more, or 98% or more.

In some embodiments of the process, the one or more sources of biomass, and solid biomass fuel are as follows:
the one or more sources of biomass comprise or consist essentially of rice husks, and wherein the solid biomass fuel has a bulk density of from 0.40 kg/L to 0.48 kg/L, and wherein the mechanical durability of the solid biomass fuel is 95% or higher;
(ii) the one or more sources of biomass comprise a mixture of rice husks and wood such as mixed wood, wherein the solid biomass fuel has a bulk density of from 0.50 kg/L to 0.65 kg/L, and wherein the mechanical durability of the solid biomass fuel is 95% or more;
(iii) the one or more sources of biomass comprise a mixture of rice husks and calliandra callothyrsus, and wherein the solid biomass fuel has a bulk density of from 0.45 kg/L to 0.60 kg/L, and wherein the mechanical durability of the solid biomass fuel is 95% or higher; wherein the bulk density is determined according to DIN EN 15103, and wherein the mechanical durability is determined according to DIN EN 15210-1.

Typically, the total dry sulphur content of the biomass solid fuel produced is 0.05 wt % or less, preferably 0.04 wt % or less, and most preferably 0.03 wt % or less, wherein the total dry sulphur content is determined according to DIN EN 15289.

Typically, the total dry hydrogen content of the biomass solid fuel produced is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel produced is 34 wt % or more, preferably from 34 wt % to 40 wt %, more preferably from 34 wt % to 38 wt %, wherein the total dry oxygen content is determined according to DIN EN 15296.

Typically, the total dry carbon content of the biomass solid fuel produced is 40 wt % or more, preferably from 45 wt % to 55 wt %, and more preferably from 50 wt % to 52 wt %, wherein total dry carbon content is determined according to DIN EN 15104.

Typically, the total dry nitrogen content of the biomass solid fuel produced is less than 0.5 wt %, preferably less than 0.4 wt % and more preferably less than 0.3 wt %, wherein the total dry nitrogen content is determined according to DIN EN 15104.

Typically, the solid biomass fuel produced is waterproof for up to 20 days, preferably up to 30 days, and more preferably up to 40 days.

Typically, the chemical oxygen demand (COD) of the solid biomass fuel produced, when immersed in water, is 5000 ppm or less, preferably 4000 ppm or less, and most preferably 3000 ppm or less, wherein the chemical oxygen demand is determined according to GB/11914-89.

Typically, the fixed carbon content of the solid biomass fuel is 28 wt % or more, preferably from 28 wt % to 35 wt %, more preferably from 30 wt % to 33 wt %, wherein the fixed carbon content is determined according to DIN EN 51734.

Typically, the ash content of the solid biomass fuel is less than 25 wt %, preferably less than 20 wt %, and most preferably less than 18 wt %, wherein the ash content is determined according to EN 14775 at 550° C.

Typically, the volatile matter content of the solid biomass fuel is from 40 wt % to 65 wt %, more preferably from 45 wt % to 60 wt %, wherein the volatile matter content is determined according to DIN EN 15148.

Typically, the moisture content of the solid biomass fuel produced is less than 8 wt %, preferably less than 6 wt %, and most preferably less than 5 wt %, wherein the moisture content is determined according to DIN EN 14774.

Typically, the calorific value of the solid biomass fuel produced is from 4300 kcal/kg dry mass to 6500 kcal/kg dry mass, wherein the calorific value is determined according to DIN EN 14918.

Typically, the bulk density of the molded biomass product is A, and the bulk density of the solid biomass fuel is B, and wherein B/A is from 0.55 to 1, wherein the bulk density is determined according to DIN EN 15103.

Preferably, the process does not comprise adding coal, an oxidiser, an igniter, or any combination thereof to the heated biomass product prior to the molding step, and wherein the solid biomass fuel does not comprise coal, an oxidiser, an igniter, or any combination thereof.

In an embodiment, step (ii) of heating the one or more biomass powders comprises heating the one or more biomass powders for a time period of from 30 minutes to 5 hours, optionally from 1 hour to 5 hours.

According to a second aspect of the invention, there is provided a solid biomass fuel obtainable or obtained by a process according to the first aspect of the invention.

According to a third aspect of the invention, there is provided a solid biomass fuel derived from one or more sources of biomass, wherein the one or more sources of biomass: (i) consist of or consist essentially of rice husks; (ii) comprise or consist essentially of a mixture of rice husks and wood such as mixed wood; (iii) consist of or consist essentially of a mixture of rice husks and calliandra callothyrsus; or (iv) comprise rice husks in an amount of at least 15% by weight, and calliandra callothyrsus, and wherein if the one or more sources of biomass consists or consists essentially of rice husks, material derived from biomass is present in the solid biomass fuel in an amount of at least 95% by weight of the total fuel content of the solid biomass fuel.

In an embodiment, the one or more sources of biomass comprise rice husk and wood such as mixed wood. Typically, the one or more sources of biomass comprise rice husk in an amount of from 20% to 80% by weight, and wood such as mixed wood in an amount of from 20% to 80% by weight. Preferably, the one or more sources of biomass do not comprise coconut shell or straw. In an embodiment, the one or more sources of biomass consist essentially of rice husk and wood such as mixed wood, wherein the one or more sources of biomass comprise rice husk in an amount of from 20% to 80% by weight, and wood such as mixed wood in an amount of from 20% to 80% by weight.

In another embodiment, the one or more sources of biomass comprise a mixture of rice husks and calliandra callothyrsus, wherein the rice husks are present in an amount of at least 15% by weight of the total weight of the one or more sources of biomass. Preferably, the one or more sources of biomass comprise rice husk in an amount of from 20% to 80% by weight, and calliandra callothyrsus in an amount of from 20% to 80% by weight. In an embodiment, the one or more sources of biomass consist essentially of rice husk and calliandra callothyrsus, wherein the one or more sources of biomass comprise rice husk in an amount of from 20% to 80% by weight, and calliandra callothyrsus in an amount of from 20% to 80% by weight.

The bulk density of the solid biomass fuel as determined according to DIN EN 15103 is typically from 0.40 kg/l to 0.65 kg/l, preferably from 0.45 kg/l to 0.60 kg/l, and most preferably from 0.50 to 0.60 kg/l.

The mechanical durability of the solid biomass fuel as determined according to DIN EN 15210-1 is typically 95% or more, 96% or more, 97% or more, or 98% or more.

In some embodiments of the process, the one or more sources of biomass, and solid biomass fuel are as follows:
the one or more sources of biomass comprise or consist essentially of rice husks, and wherein the solid biomass fuel has a bulk density of from 0.40 kg/L to 0.48 kg/L, and wherein the mechanical durability of the solid biomass fuel is 95% or higher;
(ii) the one or more sources of biomass comprise a mixture of rice husks and wood such as mixed wood, wherein the solid biomass fuel has a bulk density of from 0.50 kg/L to 0.65 kg/L, and wherein the mechanical durability of the solid biomass fuel is 95% or more;
(iii) the one or more sources of biomass comprise a mixture of rice husks and calliandra callothyrsus, and wherein the solid biomass fuel has a bulk density of from 0.45 kg/L to 0.60 kg/L, and wherein the mechanical durability of the solid biomass fuel is 95% or higher;

wherein the bulk density is determined according to DIN EN 15103, and wherein the mechanical durability is determined according to DIN EN 15210-1.

Typically, the total dry sulphur content of the biomass solid fuel produced is 0.05 wt % or less, preferably 0.04 wt % or less, and most preferably 0.03 wt % or less, wherein the total dry sulphur content is determined according to DIN EN 15289.

Typically, the total dry hydrogen content of the biomass solid fuel produced is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel produced is 34 wt % or more, preferably from 34 wt % to 40 wt %, more preferably from 34 wt % to 38 wt %, wherein the total dry oxygen content is determined according to DIN EN 15296.

Typically, the total dry carbon content of the biomass solid fuel produced is 40 wt % or more, preferably from 45 wt % to 55 wt %, and more preferably from 50 wt % to 52 wt %, wherein total dry carbon content is determined according to DIN EN 15104.

Typically, the total dry nitrogen content of the biomass solid fuel produced is less than 0.5 wt %, preferably less than 0.4 wt % and more preferably less than 0.3 wt %, wherein the total dry nitrogen content is determined according to DIN EN 15104.

Typically, the solid biomass fuel produced is waterproof for up to 20 days, preferably up to 30 days, and more preferably up to 40 days.

Typically, the chemical oxygen demand (COD) of the solid biomass fuel produced, when immersed in water, is 5000 ppm or less, preferably 4000 ppm or less, and most preferably 3000 ppm or less, wherein the chemical oxygen demand is determined according to GB/11914-89.

Typically, the fixed carbon content of the solid biomass fuel is 28 wt % or more, preferably from 28 wt % to 35 wt %, more preferably from 30 wt % to 33 wt %, wherein the fixed carbon content is determined according to DIN EN 51734.

Typically, the ash content of the solid biomass fuel is less than 25 wt %, preferably less than 20 wt %, and most preferably less than 18 wt %, wherein the ash content is determined according to EN 14775 at 550° C.

Typically, the volatile matter content of the solid biomass fuel is from 40 wt % to 65 wt %, more preferably from 45 wt % to 60 wt %, wherein the volatile matter content is determined according to DIN EN 15148.

Typically, the moisture content of the solid biomass fuel produced is less than 8 wt %, preferably less than 6 wt %, and most preferably less than 5 wt %, wherein the moisture content is determined according to DIN EN 14774.

Typically, the calorific value of the solid biomass fuel produced is from 4300 kcal/kg dry mass to 6500 kcal/kg dry mass, wherein the calorific value is determined according to DIN EN 14918.

According to a fourth aspect of the invention, there is provided a combustion process comprising the step of combusting a solid biomass fuel in accordance with the second and third aspects of the invention so as to produce energy.

In one embodiment, the solid biomass fuel is co-fired and combusted alongside a fossil fuel. Preferably, the fossil fuel comprises coal.

In one embodiment, the PM1.0 emissions of the process are less than 175 mg/kg, and preferably less than 150 mg/kg.

According to a fifth aspect of the invention, there is provided the use of a solid biomass fuel according to the second and third aspects of the invention as a fuel in a combustion process.

Preferably, the combustion process comprises co-firing the solid biomass fuel alongside a fossil fuel. Preferably, the fossil fuel is coal.

In one embodiment, the PM1.0 emissions of the process are less than 175 mg/kg, and preferably less than 150 mg/kg.

According to a sixth aspect of the invention, there is provided the use of one or more sources of biomass to produce a solid biomass fuel, wherein the one or more sources of biomass: (i) consist of or consist essentially of rice husks; (ii) comprise or consist essentially of a mixture of rice husks and wood such as mixed wood; (iii) consist of or consist essentially of a mixture of rice husks and calliandra callothyrsus; or (iv) comprise rice husks in an amount of at least 15% by weight, and calliandra callothyrsus, and wherein if the one or more sources of biomass consists or consists essentially of rice husks, material derived from biomass is present in the solid biomass fuel in an amount of at least 95% by weight of the total fuel content of the solid biomass fuel.

Preferably, the one or more sources of biomass are as described above in accordance with first and third aspects of the invention.

Preferably, the use comprises using the one or more sources of biomass in a process according to the first aspect of the invention.

Preferably, the solid biomass fuel is as described above in accordance with the first and third aspects of the invention.

BRIEF DESCRIPTION OF THE DRAWINGS

The present inventions will now be described by way of example and with reference to the accompanying Figures in which.

DETAILED DESCRIPTION OF THE INVENTION

Sources of Biomass

Figure 1:
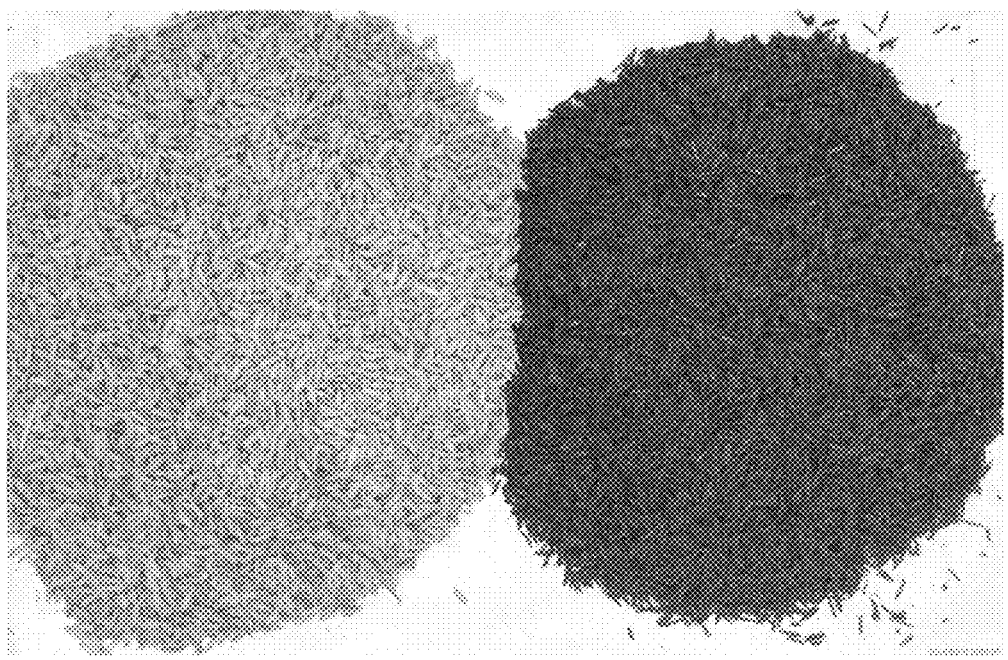
FIG. 1 is a photograph of rice husks.

The one or more sources of biomass used in accordance with the present invention can be any of those discussed above. In a preferable embodiment, the one or more sources of biomass comprise, consist essentially of or consist of rice husk. Where the one or more sources of biomass comprise rice husk and one or more additional sources of biomass, the one or more sources of biomass may contain any specific amount of the rice husk such as from 5 wt % to 95 wt %. Typically, where the one or more sources of biomass comprise rice husk and one or more additional sources of biomass, the rice husk is present in an amount of from 10% to 90% by weight, from 20% to 80% by weight, from 30% to 70% by weight, or from 40% to 60% by weight of the total amount of the one or more sources of biomass.

Where the one or more sources of biomass comprise or consist of a mixture of rice husk and calliandra callothyrsus, the rice husk is typically present in an amount of at least 15% by weight of the total weight of the one or more sources of biomass. Preferably, the rice husk is present in an amount of from 20% to 80% by weight of the total amount of the one or more sources of biomass present. Where the one or more sources of biomass comprise or consist of a mixture of rice husk and wood such as mixed wood, the rice husk is typically present in an amount of at least 15% by weight of the total weight of the one or more sources of biomass. Preferably, the rice husk is present in an amount of from 20% to 80% by weight of the total amount of the one or more sources of biomass present.

Each of the one or more sources of biomass discussed above can be obtained or harvested by routine methods known in the art.

The term "wood", as used herein, is typically used to refer to the hard fibrous substance consisting basically of xylem that makes up the greater part of the stems, branches, and roots of trees or shrubs beneath the bark. Wood is only found to a limited extent in herbaceous plants. This definition of the term "wood" is in line with the commonly understood definition in the art. The term "mixed wood", as used herein, is used to refer to a mixture of two or more varieties of wood. The two or more varieties of wood may be present in the mixed wood in any amount, provided the mixed wood comprises at least two varieties of wood.

The term "comprising" as used herein is used to mean that any further undefined component can be present. The term "consisting" as used herein is used to mean that no further components can be present, other than those specifically listed. The term "consisting essentially of" as used herein is used to mean that further undefined components may be present, but that those components do not materially affect the essential characteristics of the composition.

As discussed above, it has been found that the one or more sources of biomass used in the present invention can be grown and harvested on a commercial scale, providing increased control of the quality and specific characteristics of the biomass source compared to the materials used in the prior art. Use of said materials also avoids the environmental damage associated with using trees such as necessary deforestation. The above advantages are particularly associated with the use of rice husks and calliandra callothyrsus.

Use of the one or more sources of biomass used in the present invention has also surprisingly been found to be easier to grind than said prior used materials. For some materials, it has even been found that no grinding at all is required. This reduces the costs of the grinding process. In particular, rice husks do not generally need grinding. Calliandra callothyrsus may require grinding, but has been found to be easier to grind than said prior used materials.

Use of the materials of the invention, when ground, also provides a more homogenous mix of particle sizes than said prior used materials. Without being limited by theory, this is believed to impart advantageous properties to the final solid fuel product, such as greater uniformity and continuousness of the biomass fuel products. This is desirable in combustion processes for a number of reasons.

Rice husks are also considered to be particularly useful as a source of biomass due to the abundance of rice in certain regions of the world. At present, the area of the world used for planting rice is about 155 million hectares, with 31 million hectares being used in China alone, accounting for about 20% of the world's surface area used for rice growing. China's total rice production ranks first in the world, accounting for 31% of global production. Rice husk (shown in FIG. 1) is a major by-product produced during the processing of rice. Rice husk is a clean and renewable resource with abundant reserves. Rice husk is also cheap since it is an abundant by product of rice production processes.

However, the rice husk has a low packing density and is inconvenient to transport for at least this reason. Furthermore, when the rice husk is directly incinerated in agriculture and forestry, the dust may cause air pollution. An advantage of the use of rice husk compared with other prior used biomass raw materials is that the rice husk does not need to undergo expensive pulverization processing. However, a disadvantage of rice husks is that when conventional biomass fuel production processes are used to create fuel from the rice husk, the resultant fuel does not produce enough energy per unit volume. Accordingly, there is a need in the art for a process for producing solid biomass fuel from rice husks, that alleviates the above described disadvantages. The process of the invention has been found to alleviate said disadvantages.

Other advantages associated with the use of rice husks include the uniformity in size and density of the rice husk as a starting material, meaning that said rice husk can be torrefied directly without prior molding, as discussed in further detail below. It has also been found that solid biomass fuels produced from rice husks have increased water proof characteristics when compared to biomass solid fuels derived from different starting materials.

The term rice husk as used herein is used interchangeably with the term rice hull.

Mixing & Pulverisation of Biomass

Step (i) of providing one or more biomass powders having a particle size of from 1000 μm to 10000 μm may comprise pulverizing one or more sources of biomass.

The biomass source may be pulverised into a biomass powder by standard techniques known in the art. The biomass source may be pulverised such that the biomass powder has an average particle diameter (D50) of from 1000 μm to 10,000 μm. Typically, the one or more sources of biomass are pulverised to have an average particle diameter of from 1000 μm to 8000 μm, 2000 μm to 8000 μm or 2000 μm to 6000 μm. As discussed above, pulverising the specific biomass sources for use in the present invention has been found to provide a biomass powder with an advantageous smaller particle size distribution than provided by grinding prior known biomass sources. This is particularly the case for calliandra callothyrsus.

In an embodiment, the process comprises pulverising rice husk. In an alternative embodiment, the process does not comprise pulverising rice husk. As discussed above, an advantage of the use of rice husk is that it does not necessarily require pulverisation due to its naturally occurring particle size.

Step (i) of providing one or more biomass powders may also comprise mixing rice husk with one or more other sources of biomass. The mixing may be done using standard techniques known in the art. In an embodiment, the one or more sources of biomass in addition to rice husk are pulverised so as to have a particle size of from 1000 μm to 10000 μm. In another embodiment, there is no need to pulverise the one or more additional sources of biomass since they may have a naturally occurring particle size of from 1000 μm to 10,000 μm.

Heating of Biomass Powder

The one or more biomass powders are heated so as to produce a heated biomass product. The heating is carried out at a temperature of from 160° C. to 420° C. for a time period of from 0.25 to 5 hours. Preferably, the step of heating the molded biomass product is carried out for a time period of from 0.4 to 2 hours. Preferably, the step of heating the one or more biomass powders comprises heating the one or more biomass powders to a temperature of from 180° C. to 350° C., and more preferably to a temperature of from 210° C. to 280° C.

Preferably, the step (ii) of heating the one or more biomass powders comprises heating the one or more biomass powders under conditions so as to induce torrefaction of the one or more biomass powders. Torrefaction is a process of mild pyrolysis in which the heating is carried out in a low oxygen atmosphere such as an atmosphere of less than 10% oxygen content. Suitable conditions and processes of torrefaction are known in the art. Accordingly, preferably step (ii) of heating the one or more biomass powders comprises torrefaction.

The heating step may be carried out in any suitable apparatus known in the art for heating one or more biomass powders. For example, the heating step may be carried out in apparatus and using process conditions as disclosed in EP3287509A1.

Preferably, step (ii) of heating the one or more biomass powders is adapted so as to control the uniformity of the heated biomass product, optionally wherein adapting step (ii) so as to control the uniformity of the heated biomass product comprises conducting step (ii) in an apparatus in which the one or more biomass powders are rotated whilst being heated, optionally, wherein adapting step (ii) so as to control the uniformity of the heated biomass product comprises controlling the speed or direction of rotation of the one or more biomass powders, optionally wherein the one or more biomass powders are rotated in the apparatus in both an anticlockwise and clockwise direction. The uniformity of the heated biomass product is also optimised by the heating temperatures and time periods discussed above. Without being limited by theory, it is believed that a greater uniformity in the heated biomass product is passed onto the solid biomass fuel product once molded, so that a more uniform solid biomass fuel is produced.

Where the process of the invention comprises a cooling step after the step of heating the biomass, the cooling step may comprise rotating the biomass. The biomass may be rotated in a suitable apparatus such as those disclosed in EP3287509A1. Preferably, both heating step (ii) and the step of cooling the biomass comprise rotating the biomass. Where the biomass is rotated in either the cooling step or the heating step, the biomass may be rotated in different directions, such as both clockwise and anti-clockwise in successive cycles.

The term 'uniformity' of the solid biomass product is used to refer to the solid biomass fuel or heated biomass product having constant or similar properties across each particle of solid biomass fuel or heated biomass product and across the plurality of particles within a bulk sample of the solid biomass fuel product or heated biomass product. For example, but not limited to, the densities of the particles, the ease of combustion of the particles, the chemical composition of the particles, and the water resistant properties of the particles. Uniformity is a highly desirable property for biomass fuels for use in combustion processes.

It has also been found by the inventors that controlling the heating step in the manner discussed above additionally aids in providing a solid biomass fuel product with enhanced water proof properties compared to the biomass fuels of the prior art. During the heating step, hydrophilic compounds present in the biomass powders that absorb water are degraded. Furthermore, the heating step causes oils present in the biomass powders to migrate to the exterior of the biomass powder particles, increasing the hydrophobicity of said particles.

Molding the Heated Biomass Product

The biomass powder is molded so as to provide a solid biomass fuel. The molding step may be carried out in any molding apparatus known in the art and in accordance with biomass molding techniques known in the art, and may include extrusion systems. Preferably, the molding step is carried out in a compression mold. Preferably, the compression mold comprises a mold product exit hole. The molding step may be carried out using an apparatus as described in CN105435708.

Preferably, the molding step comprises molding the biomass powder into pellets. Accordingly, in a preferred embodiment, the solid biomass fuel product comprises biomass pellets.

Whilst it is known to mold biomass powder to produce molded biomass products, the inventors of the present invention have surprisingly discovered that adapting the molding step such that the density of the molded biomass product produced from said step is controlled so as to be within a certain range imparts certain advantageous properties to the final solid biomass fuel product. Specifically, controlling the molding step such that the density of the molded biomass product is within the range of from 0.60 to 1.30 kg/L has been found to impart advantageous properties to the final biomass fuel product. Preferably, the molding step is controlled such that the density of the molded biomass product is from 0.70 kg/L to 1.25 kg/L.

The molding step may be controlled in a variety of ways. Where the molding process comprises the use of a compression mold, the density is controlled by using a compression ratio of from 3.8 to 6.5. Typically, the smaller the compression ratio, the lower the density of the molded biomass product. However, the higher the compression ratio, the lower the yield of the molded biomass product.

The compression ratio for a compression mold with a mold product exit hole may be defined as the ratio of the length to the diameter of the mold product exit hole.

Figure 21:
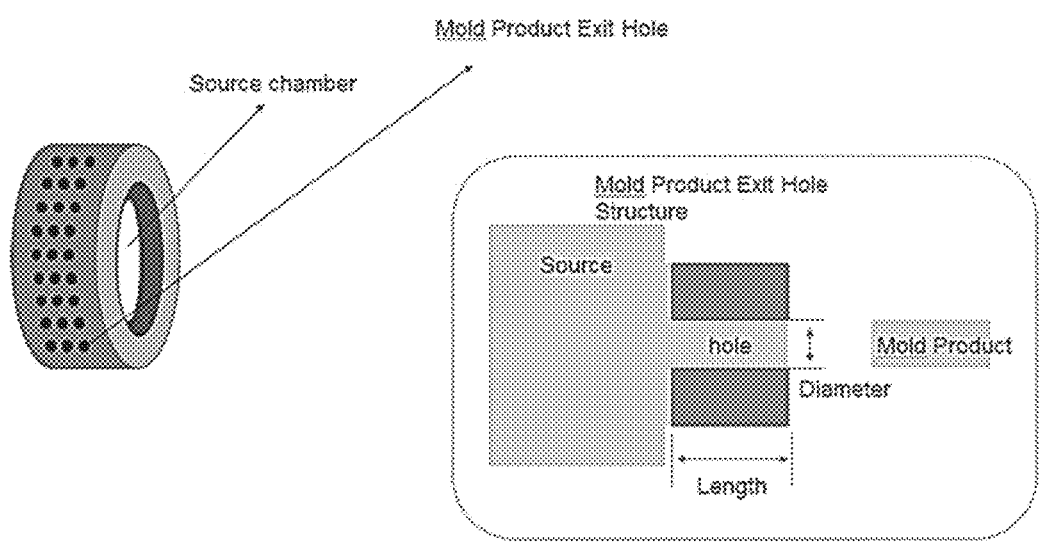
FIG. 21 is a diagram of a compression mold that may be used in the molding step of the process of the invention.

FIG. 21 shows an example of a compression mold that may be used in accordance with the present invention. The heated biomass product is inserted into the interior of the mold before being squeezed from inside the mold by pressure such that it exits the mold product exit hole in the Figure. The compression ratio is shown in the Figure as the ratio of the length of the product out hole to its diameter.

In the process of the invention, preferably, the step (iii) of molding the biomass powder comprises adapting the molding step such that that density of the molded biomass product is controlled to be within the range of from 0.70 kg/L to 1.25 kg/L. Preferably, the density is controlled by using a compression mold and controlling the compression ratio of the compression mold. More preferably, the compression ratio is from 3.8 to 6.5.

Controlling the density of the molded biomass product during the molding step has been found, surprisingly, to provide a final biomass fuel product with increased water proof capacity. Preferably, the solid biomass fuel product produced from a molded biomass product with a density within the range of from 0.70 kg/L to 1.25 kg/L is sufficiently water proof for up to 20 days, and preferably up to 30 days.

Preferably, an additive is added to the heated biomass product prior to step (iii) of molding the heated biomass product. Said additive is believed to improve the molding process and increase the yield of the molded biomass product produced from the molding step. Suitable additives are known in the art and include, but are not limited to starch, or starch derivatives.

Figure 2:
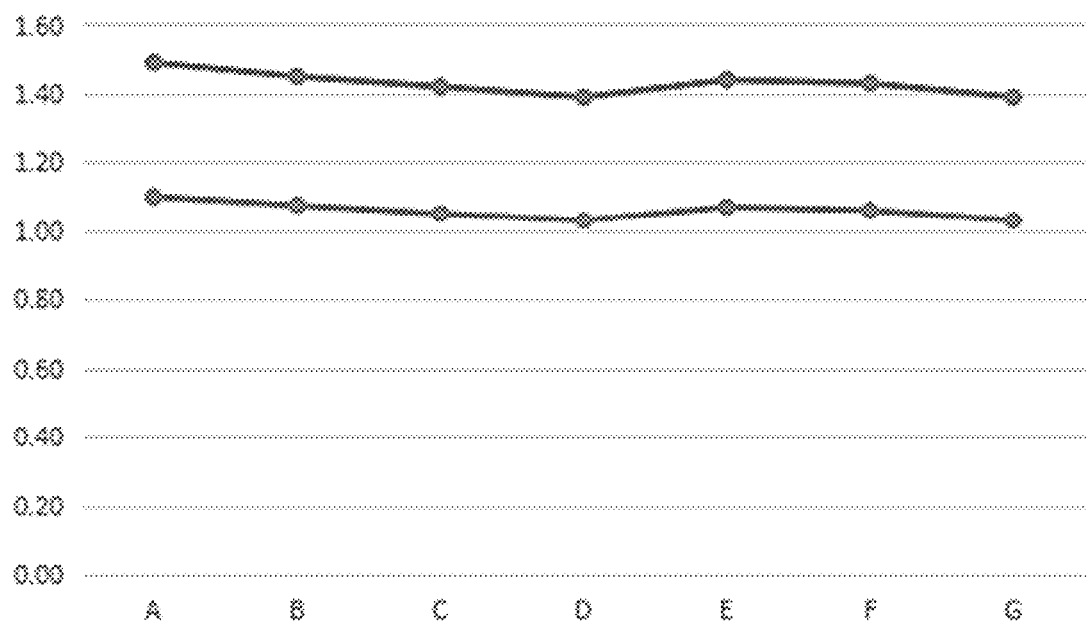
FIG. 2 is a graph depicting the difference in production yields during themolding step, where the biomass source consists of rice husk.

FIG. 2 shows the difference in yields after the molding step when an additive is included during the molding step against when an additive is not included, where the one or more sources of biomass consists of rice husk. It can be seen that higher yields are obtained when an additive is added to the heated biomass product before molding.

Figure 3:
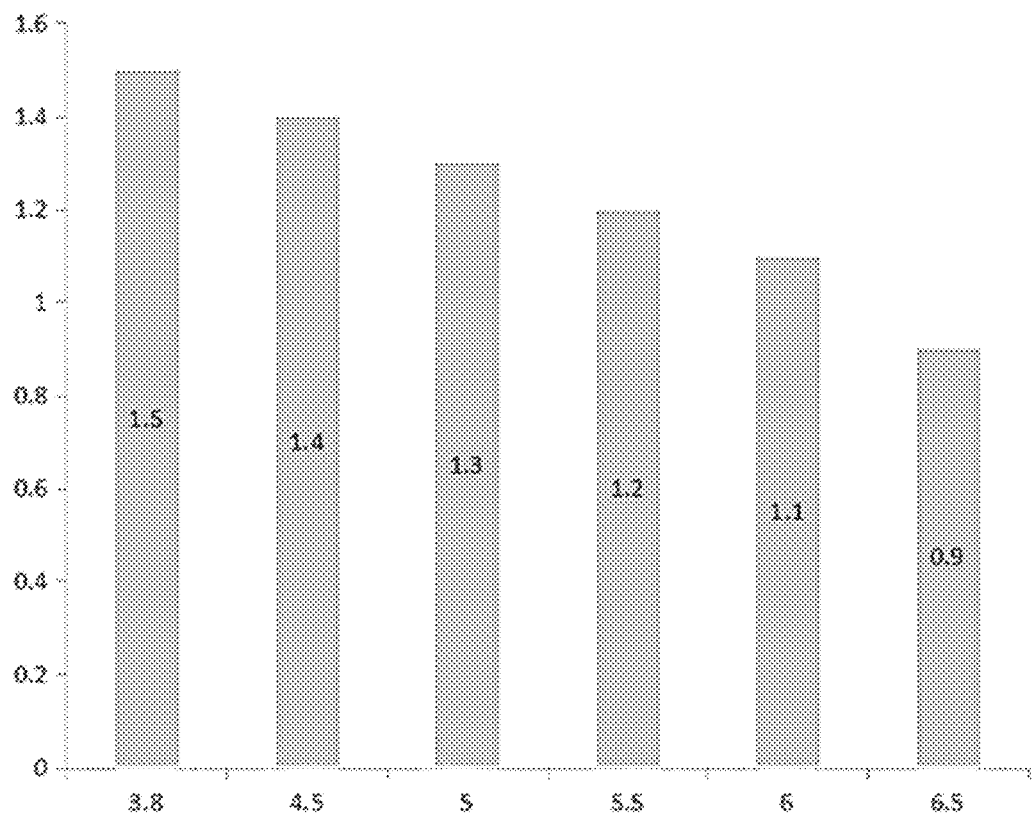
FIG. 3 is a graph depicting the compression ratio on the X-axis versus the productivity on the Y-axis for a molded biomass product produced in accordance with the method of the present invention. The biomass source here consists of rice husks.

FIG. 3 is a graph depicting the compression ratio on the X-axis versus the productivity on the Y-axis for a molded biomass product produced in accordance with the method of the present invention. The biomass source here consists of rice husks.

Figure 4:
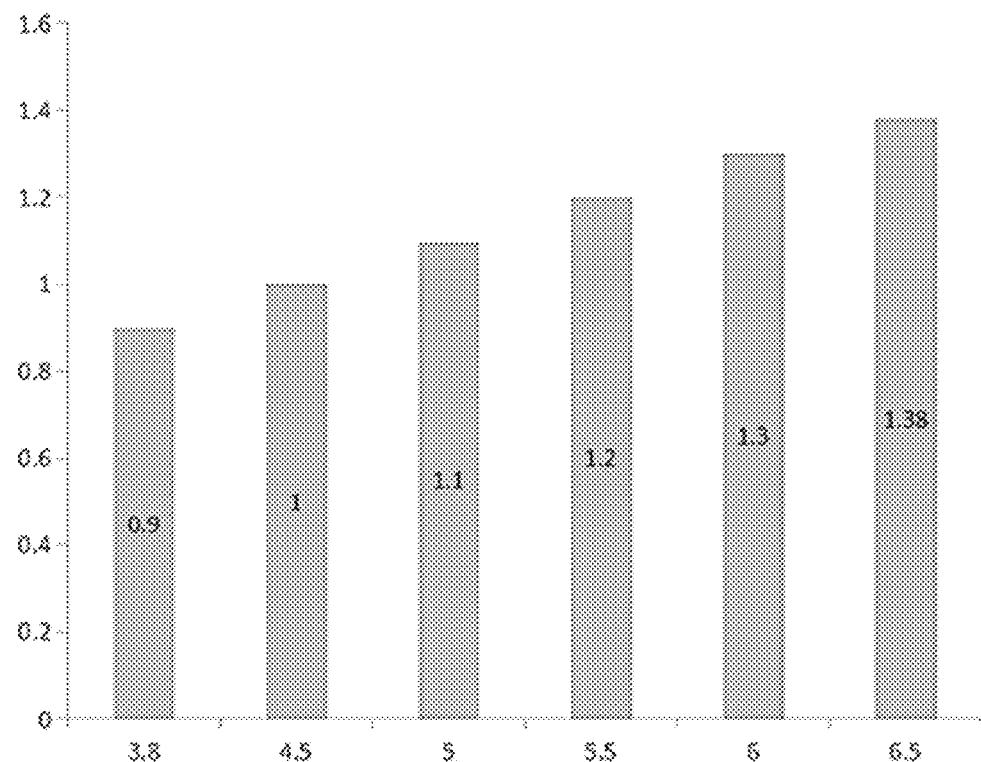
FIG. 4 is a graph depicting the compression ratio on the x-axis versus the density on the y-axis (kg/L) for a molded biomass product produced in accordance with the method of the present invention, wherein the biomass source consists of rice husks.

FIG. 4 is a graph depicting the compression ratio on the x-axis versus the density on the y-axis (kg/L) for a molded biomass product produced in accordance with the method of the present invention, wherein the biomass source consists of rice husks.

In processes of the invention, once molding step (iii) has been carried out, in some embodiments, the direct product of the molding step (referred to herein as a molded biomass product) may be used directly as the solid biomass fuel in combustion processes. In alternative embodiments, the molded biomass product may be further treated so as to provide the solid biomass fuel product. Accordingly, in some embodiments, the process of the invention further comprises a step of treating the direct product of the molding step (molded biomass product) so as to form the solid biomass fuel.

The present invention involves heating biomass powder prior to molding the heated biomass particles. This is in contrast to known processes where molding is carried out prior to torrefaction of the biomass. An advantage of torrefaction before molding is that the torrefaction process is easier and requires less energy due to the smaller particle size and larger surface area of the biomass powders, compared with the larger size of molded pellets. In processes where torrefaction occurs after molding, in some processes, only the exterior of molded pellets are effectively torrefied, and not the interior. Furthermore, torrefaction of molded pellets can lead to cracking of the pellets during the heating step. Accordingly, molding after torrefaction has been found to be advantageous.

However, known processes involve molding prior to torrefaction because molding is necessary to provide a uniform and homogenous shaped pellet product. It is highly desirable that biomass particles being subjected to torrefaction are of a uniform size. With prior known biomass starting materials such as various types of wood, molding before torrefaction is necessary because the grinding processes used to break down wood into smaller particles do not provide a sufficiently uniform ground product. Thus, molding of said ground particles is necessary to provide a uniform product for torrefaction. In contrast, when rice husk is used as a biomass starting material, torrefaction may advantageously be carried out prior to molding due to the naturally occurring small and uniform size of the rice husk particles that either do not need grinding or only require minimal grinding to produce a large surface area, uniform product. Said product can be torrified without molding, thus providing the advantages discussed above.

Typically, other than additives such as those discussed above, no other fuel source is added to the heated biomass product during the molding step. Accordingly, the molded biomass product of the molding step (i.e. the solid biomass fuel) comprises only material derived from biomass as the fuel source in the solid biomass fuel. For example, when the heated biomass product is molded into pellets, typically, no other fuel source is added to the heated biomass products prior to molding such that the solid biomass fuel pellets produced by the molding step only contain a fuel source derived from biomass. In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass. Where the one or more sources of biomass consist or consist essentially of rice husk, the biomass solid fuel comprises at least 95% by weight of the total fuel content of the fuel of material derived from biomass.

This is in contrast to certain processes known in the art, where solid fuel pellets are produced in a molding step, and during the molding step material derived from biomass is mixed with an alternative fuel source such as coal. Said pellets will thus comprise material derived from biomass and also an additional fuel source such as coal.

Where the term total fuel content of the solid fuel is used herein, this is intended to refer to the component of the solid fuel that is combustible material such as biomass derived material and coal. The term fuel content in relation to solid fuel is not intended to encompass additives that may be present in the solid fuel pellets that do not themselves combust to produce energy.

The molding step has also been found to enhance the waterproof properties of the final biomass solid fuel product. The increase in density that occurs during the molding step means that it is harder for water to penetrate the denser molded biomass product particles.

Furthermore, with a denser product, more biomass is concentrated in the interior of the molded product, and so is not in direct contact with water.

The Solid Biomass Fuel Product

The solid biomass fuel product may have any of the physical properties discussed above.

As discussed above, the biomass solid fuel of the invention preferably comprises pellets. The pellets may be any suitable size. Preferably, the pellets have a diameter of from 3 mm to 100 mm, and more preferably, 5 mm to 8 mm. Preferably, the pellets have a length of from 20 mm to 60 mm, and more preferably from 30 mm to 50 mm. As discussed above, surprisingly, it has been found that the solid biomass fuel product of the invention has enhanced waterproof characteristics compared to solid biomass fuel products made by prior art processes. This is believed to be due to controlling the molding and/or heating step as discussed above. Biomass fuels of the prior art have been found by the inventors to be sufficiently water proof for only up to 10 days. In contrast, it has been found the solid biomass fuel products of the invention are sufficiently water proof up to 20 days, preferably 30 days and more preferably 40 days.

The water proof properties of the solid biomass fuels are determined according to standard tests of the Energy Research Centre of the Netherlands (ECN), described in further detail below.

The moisture content of the biomass solid fuel of the invention may also be determined by standard ECN test methods. The moisture content of the solid biomass fuel of the invention is typically from 5 to 9 wt %, preferably 6 to 8 wt %, and more preferably 6 to 7 wt %.

The solid biomass fuel of the invention has also been found to have unexpectedly high mechanical durability. The mechanical durability is typically higher than 95%. This is advantageous since biomass pellets of 95% mechanical durability or greater have been found to be able to stored outside without damage to for periods as long as two months. In contrast, biomass pellets with less than 95% mechanical durability typically are damaged by rainfall and are not able to be stored outside. Accordingly, high mechanical durability is an additional advantage of biomass pellets of the invention.

An additional advantage associated with high durability of the solid biomass fuel particles is that if the pellets are somehow broken by force, they fall apart in larger pieces than pellets with low mechanical durability. This minimises any dust explosion risks.

As discussed above, in preferable embodiments, typically, other than additives such as those discussed above, no other fuel source is added to the heated biomass product during the molding step. Accordingly, the solid biomass fuel typically comprises only material derived from biomass as the fuel source in the solid biomass fuel. For example, when the heated biomass product is molded into pellets, typically, no other fuel source is added to the heated biomass products prior to molding such that the solid biomass fuel pellets produced by the molding step only contain a fuel source derived from biomass.

In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass. Where the one or more sources of biomass consist or consist essentially of rice husk, the biomass solid fuel comprises at least 95% by weight of the total fuel content of the fuel of material derived from biomass.

Typically, the solid biomass fuel does not comprise an oxidiser, an igniter or any combination thereof. For example, when molded into pellets, preferably the pellets of solid biomass fuel do not comprise an igniter or oxidiser, Examples of oxidisers and igniters are known in the art such as potassium permanganate. An advantage associated with the present invention, is that the solid biomass fuel does not require said igniters and oxidisers to be effectively combusted. Previously, where rice husk has been used as a source of biomass in fuel products, it has been necessary to include an igniter or oxidiser therein for sufficient combustion of the fuel.

Additionally, as discussed above, preferably, the solid biomass fuel products of the invention do not comprise an additional source of fuel such as a fossil fuel, such as coal. Previously, where rice husk has been used as a source of biomass for fuel, the rice husk has been combined with coal so as to effectively combust and provide sufficient energy during a combustion process. An unexpected advantage of the present invention is that the solid biomass fuel products do not need to comprise coal or any other additive to be effectively combusted or to provide sufficient energy during combustion processes.

Without being limited by theory, it is believed that the control of the density during the molding step and the control of the uniformity during the heating step discussed above confer superior performance characteristics upon the biomass solid fuel products of the invention such that said products can be effectively combusted without the need for the addition of oxidiser or igniter compounds and coal during the molding step such that the final biomass solid fuel pellets comprise coal and oxidiser or igniter compounds as well as biomass.

Combustion Processes

The product of the present invention may be used in a variety of different combustion processes. The suitability of said products for use in a particular process will be apparent to those of skill in the art. For example, the biomass fuel of the invention may be used in a combustion process in a power plant or industrial process on its own. Alternatively, the biomass product of the invention may be used in a combustion process along with an additional fuel such as coal in a co-firing process.

Advantageously, products of the invention have been found to provide very low PM1.0 emissions when compared to other biomass fuels known in the art. Additionally, the PM1.0 emissions of the process are lower than processes that involve the combustion of coal.

Advantageously, the improved physical properties of biomass fuels of the invention have been found to render the biomass particularly suitable for co-firing with coal. For example, the improved quality and uniformity of the product enable the biomass fuel of the invention to be co-fired with coal particularly well. The improved water proof properties of the biomass fuel of the invention also mean that the biomass is particularly suited to being co-fired with coal as well as being made easier to store and transport due to its water proof nature.

Example 1

A process according to the present invention was carried out. The source of biomass was rice husk only. The temperature of the heating step was from 220° C. to 280° C. for a time period of from 0.4 to 2 hours. After the heating step, the heated rice husks were cooled and then molded to obtain a solid biomass fuel.

Figure 5:
FIG. 5 is a photograph of the biomass fuel product of the present invention.

A photograph of the solid product is shown in FIG. 5.

Example 2

A process according to the present invention was carried out. The source of biomass was 75% by weight rice husk and 25% by weight missed wood. The temperature of the heating step was from 220° C. to 280° C. for a time period of from 0.4 to 2 hours. After the heating step, the heated biomass product were cooled and then molded to obtain a solid biomass fuel.

Example 3

A process according to the present invention was carried out. The source of biomass was 50% by weight rice husk and 50% by weight missed wood. The temperature of the heating step was from 220° C. to 280° C. for a time period of from 0.4 to 2 hours. After the heating step, the heated biomass product were cooled and then molded to obtain a solid biomass fuel.

Example 4

A process according to the present invention was carried out. The source of biomass was 25% by weight rice husk and 75% by weight mixed wood. The temperature of the heating step was from 220° C. to 280° C. for a time period of from 0.4 to 2 hours. After the heating step, the heated biomass product were cooled and then molded to obtain a solid biomass fuel.

Example 5

A process according to the present invention was carried out. The source of biomass was 75% by weight rice husk and 25% by weight of calliandra callothyrsus. The temperature of the heating step was from 220° C. to 280° C. for a time period of from 0.4 to 2 hours. After the heating step, the heated biomass product were cooled and then molded to obtain a solid biomass fuel.

Example 6

A process according to the present invention was carried out. The source of biomass was 50% by weight rice husk and 50% by weight of calliandra callothyrsus. The temperature of the heating step was from 220° C. to 280° C. for a time period of from 0.4 to 2 hours. After the heating step, the heated biomass product were cooled and then molded to obtain a solid biomass fuel.

Example 7

A process according to the present invention was carried out. The source of biomass was 25% by weight rice husk and 75% by weight of calliandra callothyrsus. The temperature of the heating step was from 220° C. to 280° C. for a time period of from 0.4 to 2 hours. After the heating step, the heated biomass product were cooled and then molded to obtain a solid biomass fuel.

Characterisation of Solid Biomass Fuels Produced in Examples 1 to 7

Figure 6:
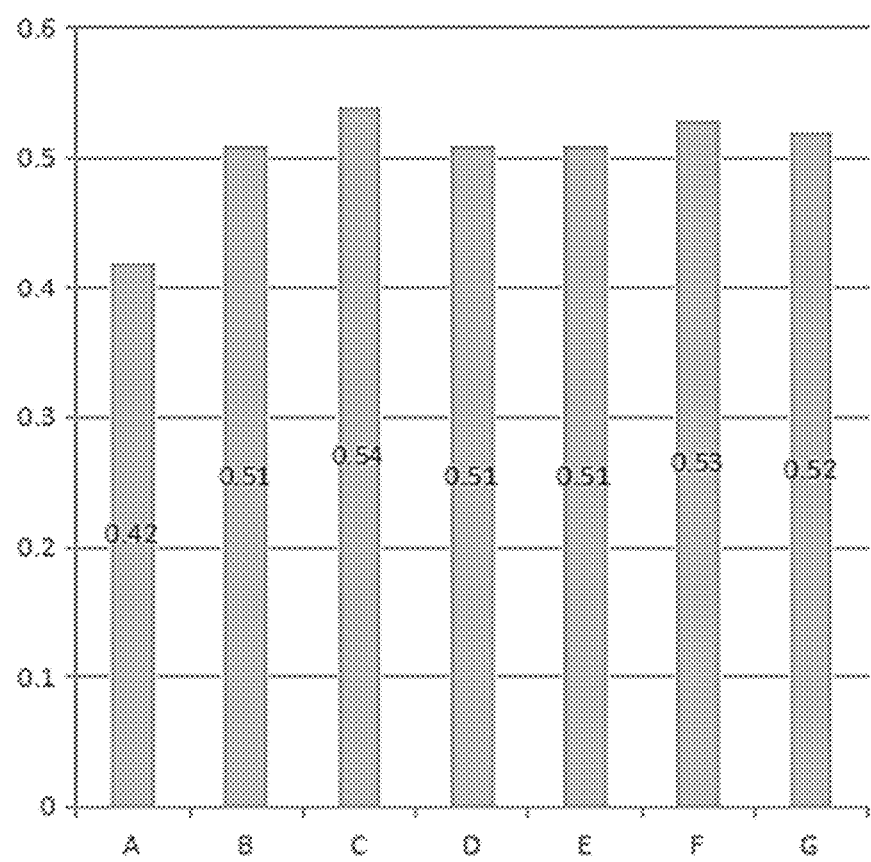
FIG. 6 is a graph depicting the bulk density of several products of the present invention.

The bulk density (kg/L) of the solid biomass fuels prepared in Examples 1 to 7 was measured using DIN EN 15103, and is shown in FIG. 6.

Figure 7:
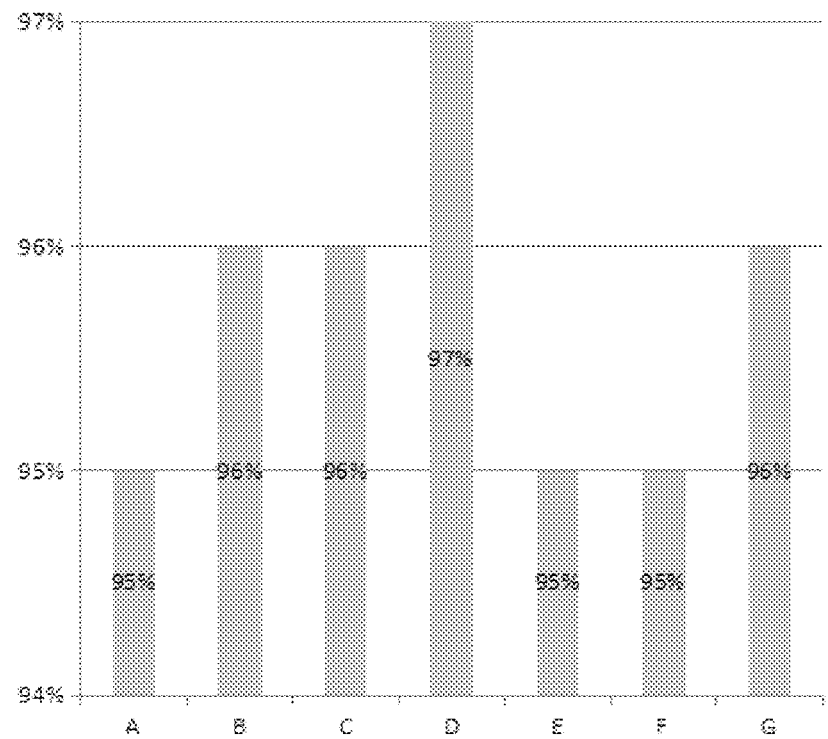
FIG. 7 is a graph depicting the durability of several products of the present invention.

The durability of the solid biomass fuels prepared in Examples 1 to 7 was determined according to DIN EN 15210-1, and is shown in FIG. 7.

Figure 8:
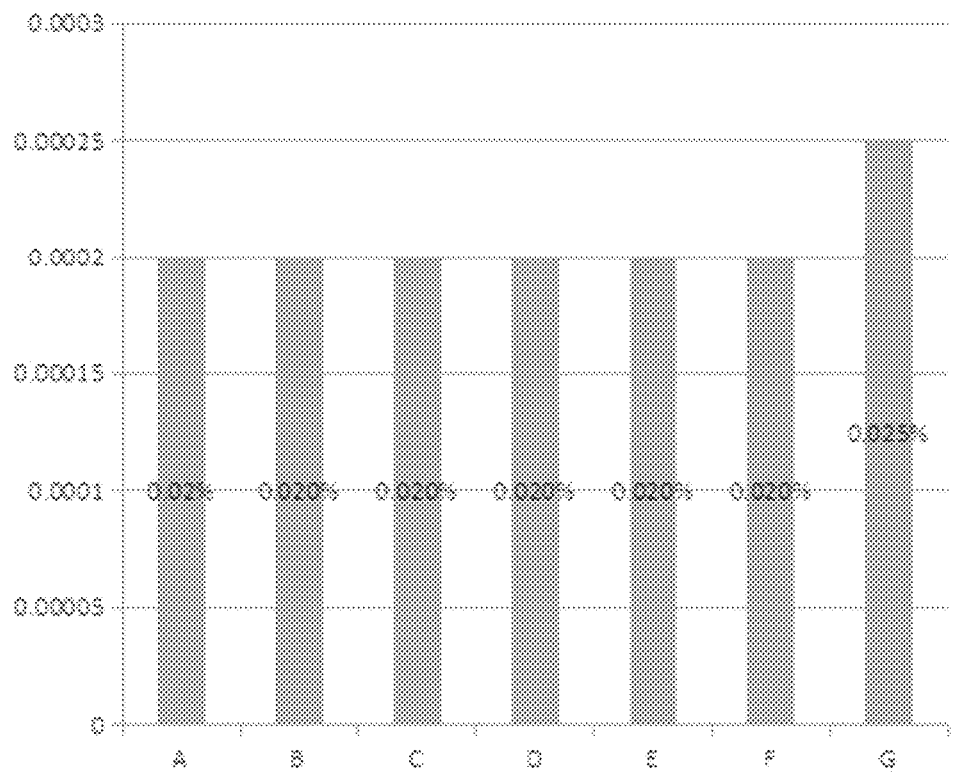
FIG. 8 is a graph depicting the sulfur content of several products of the invention.

The sulfur content of the solid biomass fuels prepared in Examples 1 to 7 is shown in FIG. 8. The sulphur content is determined in accordance with DIN EN 15289.

Figure 9:
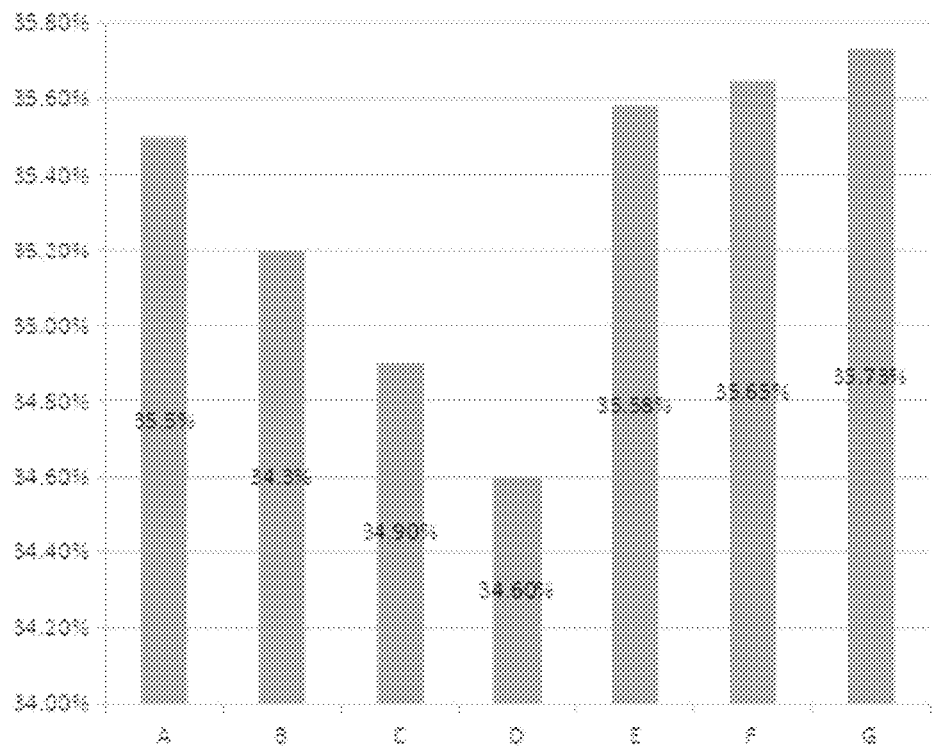
FIG. 9 is a graph depicting the oxygen content of several products of the present invention.

The oxygen content of the solid biomass fuels prepared in Examples 1 to 7 is shown in FIG. 9. The oxygen content was determined according to DIN EN 15296.

Figure 10:
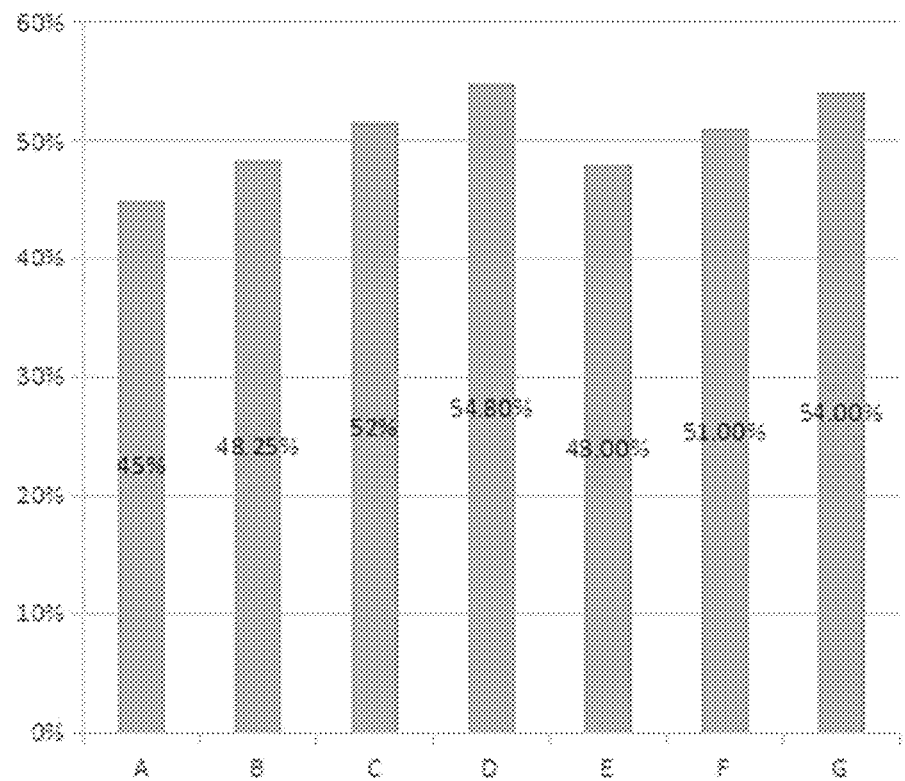
FIG. 10 is a graph depicting the carbon content of several products of the invention.

The carbon content of the biomass solid fuel prepared in Examples 1 to 7 is shown in FIG. 10. The carbon content is determined in accordance with DIN EN 15104.

Figure 11:
FIG. 11 is a graph depicting the nitrogen content of several products of the invention.

The nitrogen content of the biomass solid fuel prepared in Examples 1 to 7 is shown in FIG. 11. The nitrogen content is determined in accordance with DIN EN 15104.

Figure 12:
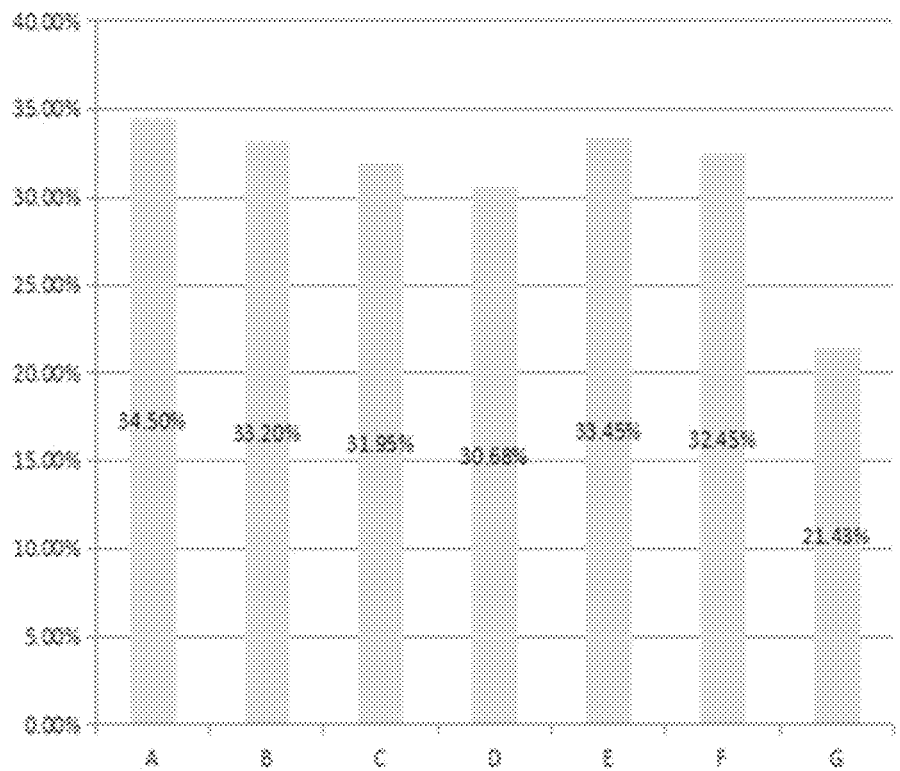
FIG. 12 is a graph depicting the fixed carbon content of several products of the invention.

The fixed carbon content of the biomass solid fuel prepared in Examples 1 to 7 is shown in FIG. 12. The fixed carbon content is determined in accordance with DIN EN 51734.

Figure 13:
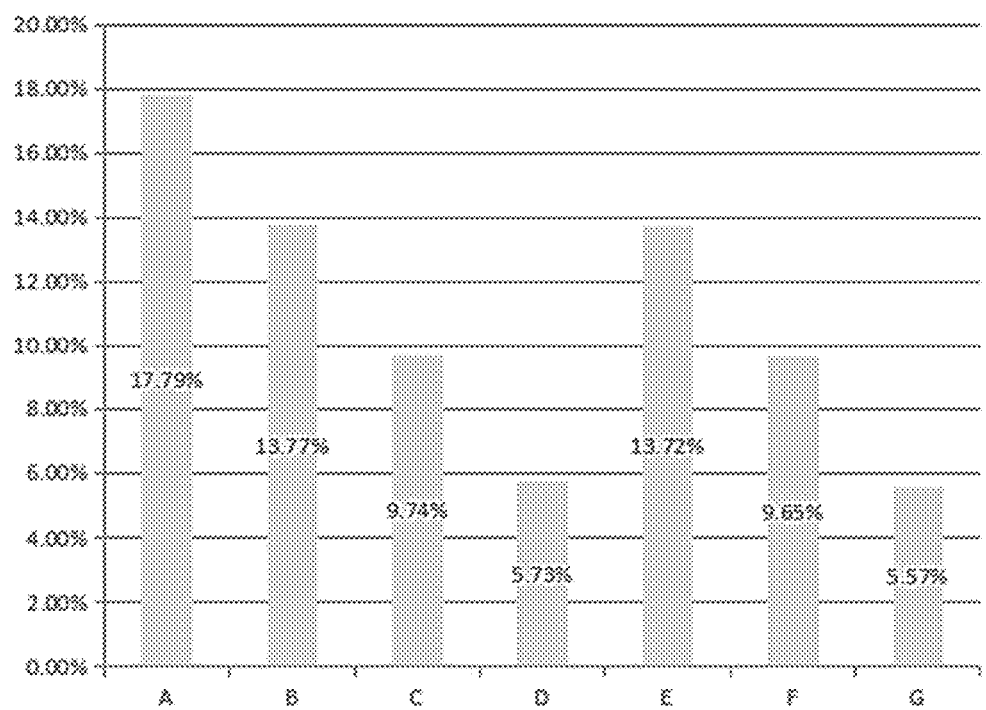
FIG. 13 is a graph depicting the ash content of several products of the present invention.

The ash content of the biomass solid fuel prepared in Examples 1 to 7 is shown in FIG. 13. The ash content was determined according to DIN EN 14775 at 550° C.

Figure 14:
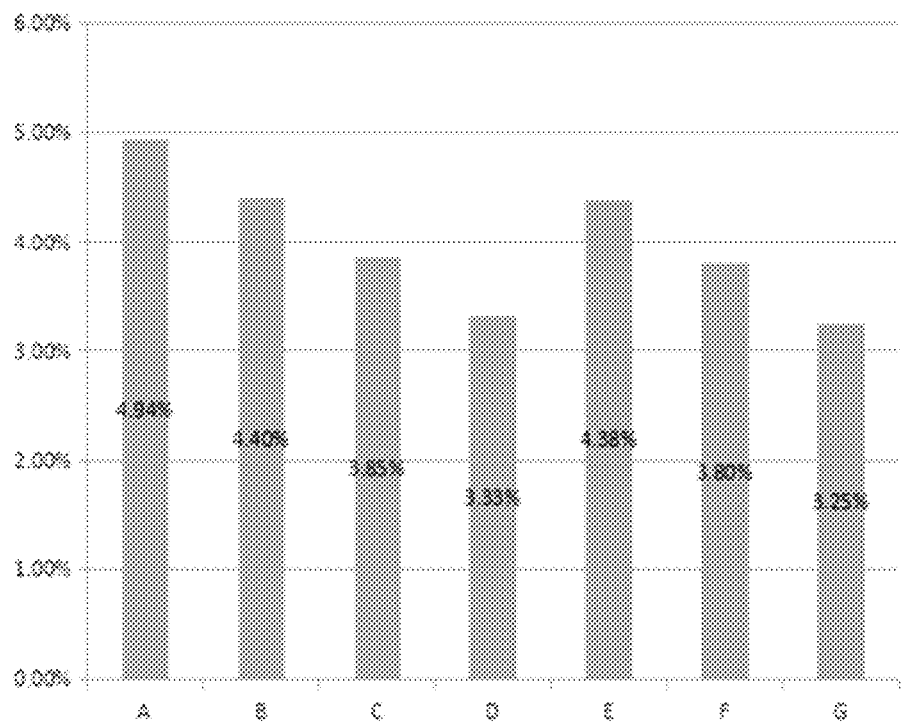
FIG. 14 is a graph depicting the moisture content of several products of the present invention.

The moisture content of the biomass solid fuel prepared in Examples 1 to 7 is shown in FIG. 14. The water content was determined in accordance with DIN EN 14774-2.

Figure 15:
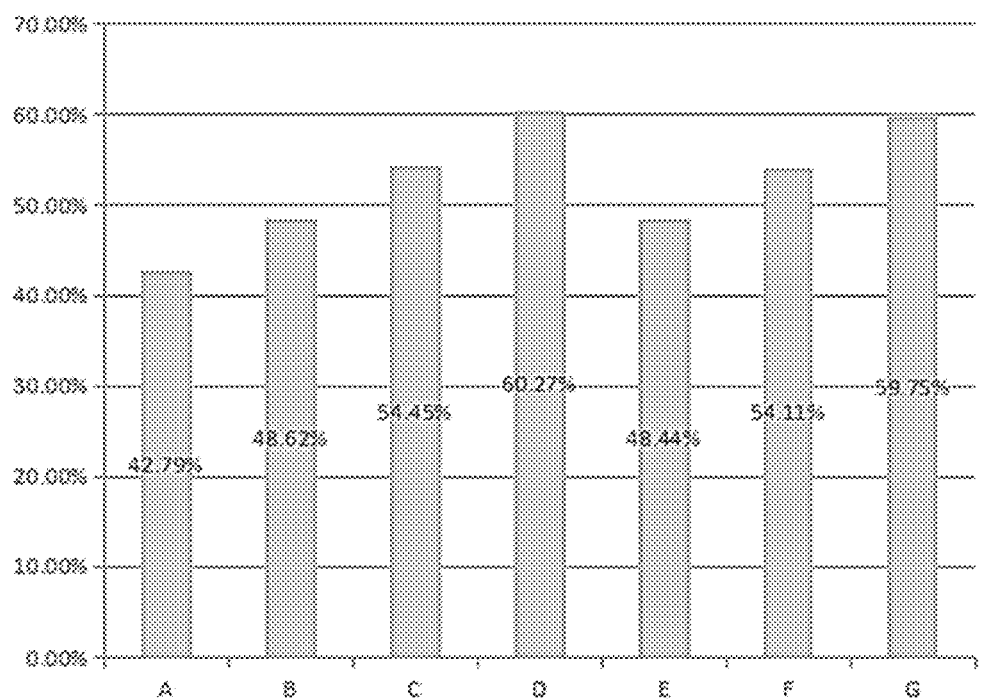
FIG. 15 is a graph depicting the volatile matter content of several products of the present invention.
Figure 16:
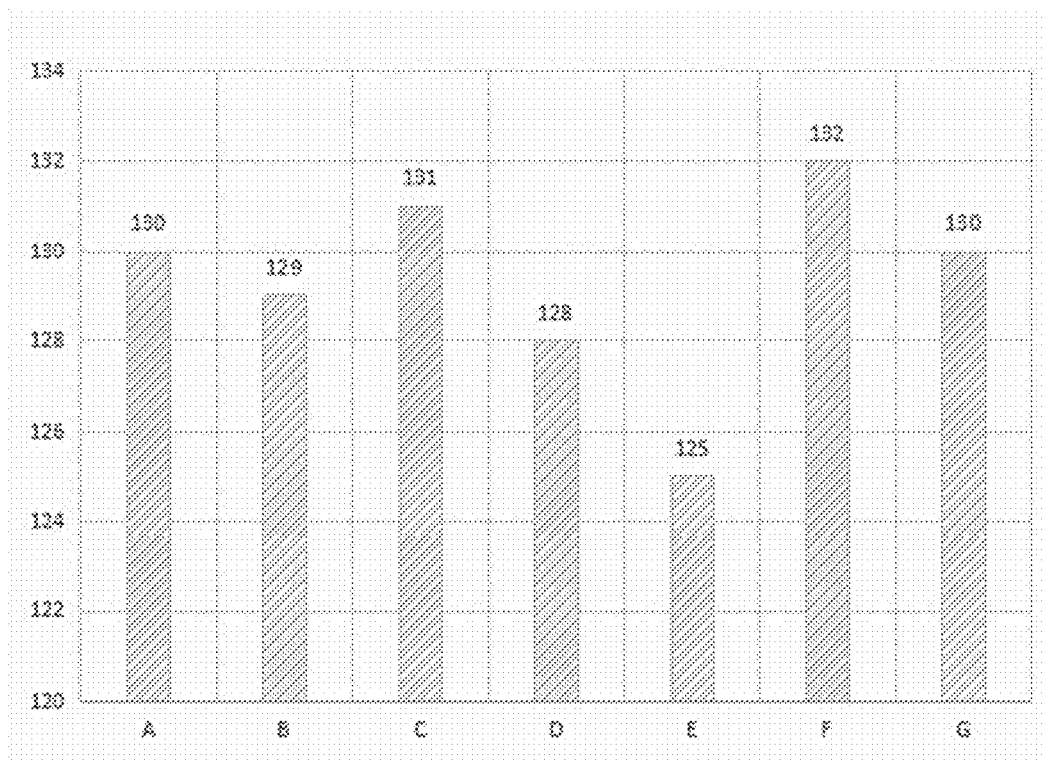
FIG. 16 is a graph depicting PM 1.0 emissions for several products of the present invention.

The volatile matter content of the solid biomass fuels prepared in Examples 1 to 7 is shown in FIG. 15. The PM1.0 emissions of the biomass solid fuels produced in Examples 1 to 7 are shown in FIG. 16. The PM1.0 emissions were determined according to the standard method of the German ECN testing institute.

In the above figures, the product of Example 1 is represented as A, the product of Example 2 is represented as B, the product of Example 3 is represented as C, the product of Example 4 is represented as D, the product of Example 5 is represented as E, the product of Example 6 is represented as F, and the product of Example 7 is represented as G.

Example 8

The solid biomass fuel of Example 1 was tested in an artificial climate experiment where it was exposed to an artificial climate chamber for 10 days. This test is an ECN standard test for assessing the moisture content of biomass fuel particles.

Figure 17:
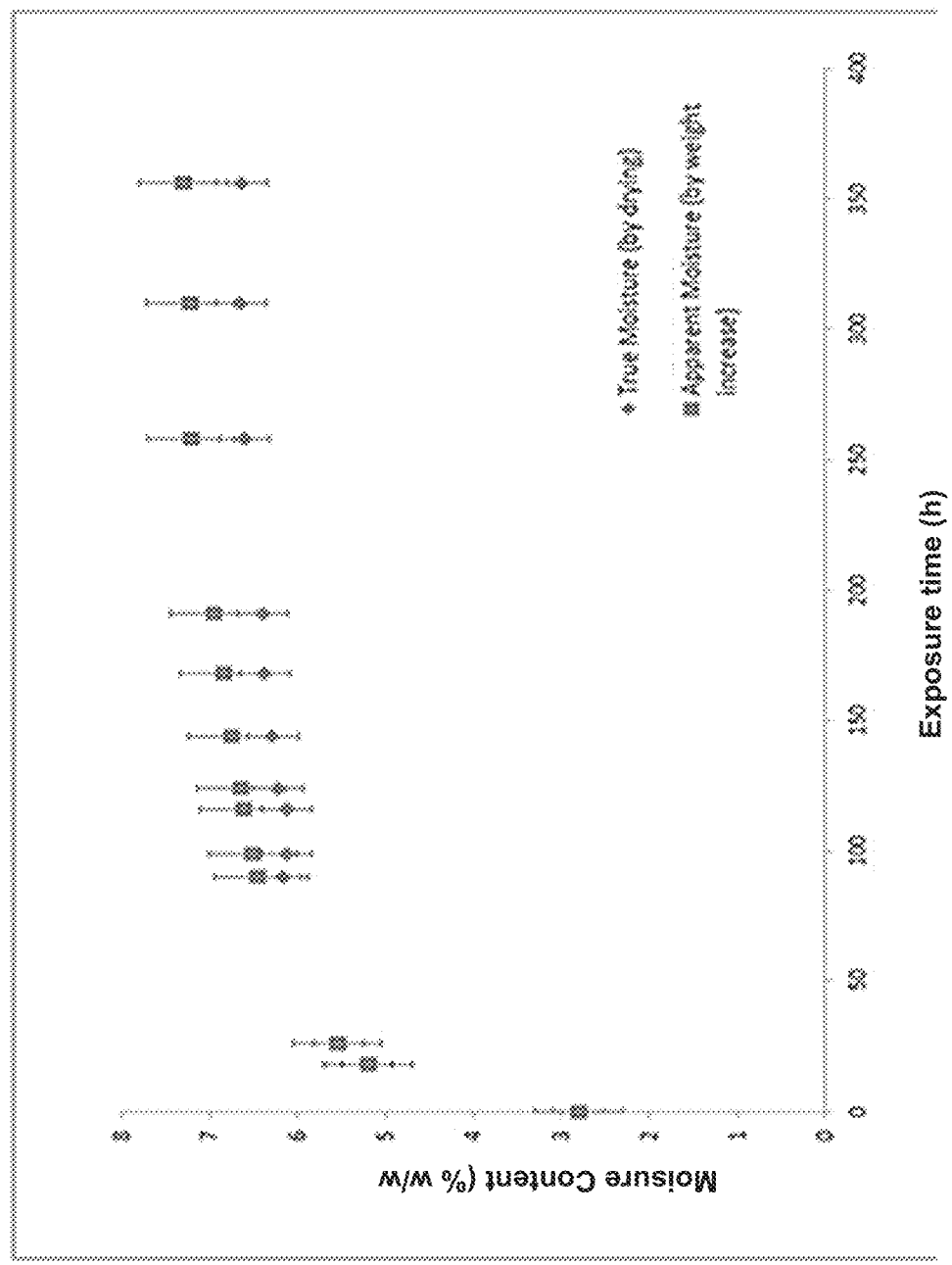
FIG. 17 shows the results of a test of a product of the invention in an artificial climate chamber.

The results of this test are shown in FIG. 17. The results in FIG. 17 show that the equilibrium moisture uptake of the biomass particles stabilized at 6 to 7 wt % after about 14 days of exposure at 27° C. and 90% relative humidity. This is a low moisture content of the biomass fuel particles and indicates that the biomass particles are highly hydrophobic and highly water resistant compared to biomass solid fuels known in the art.

Figure 18:
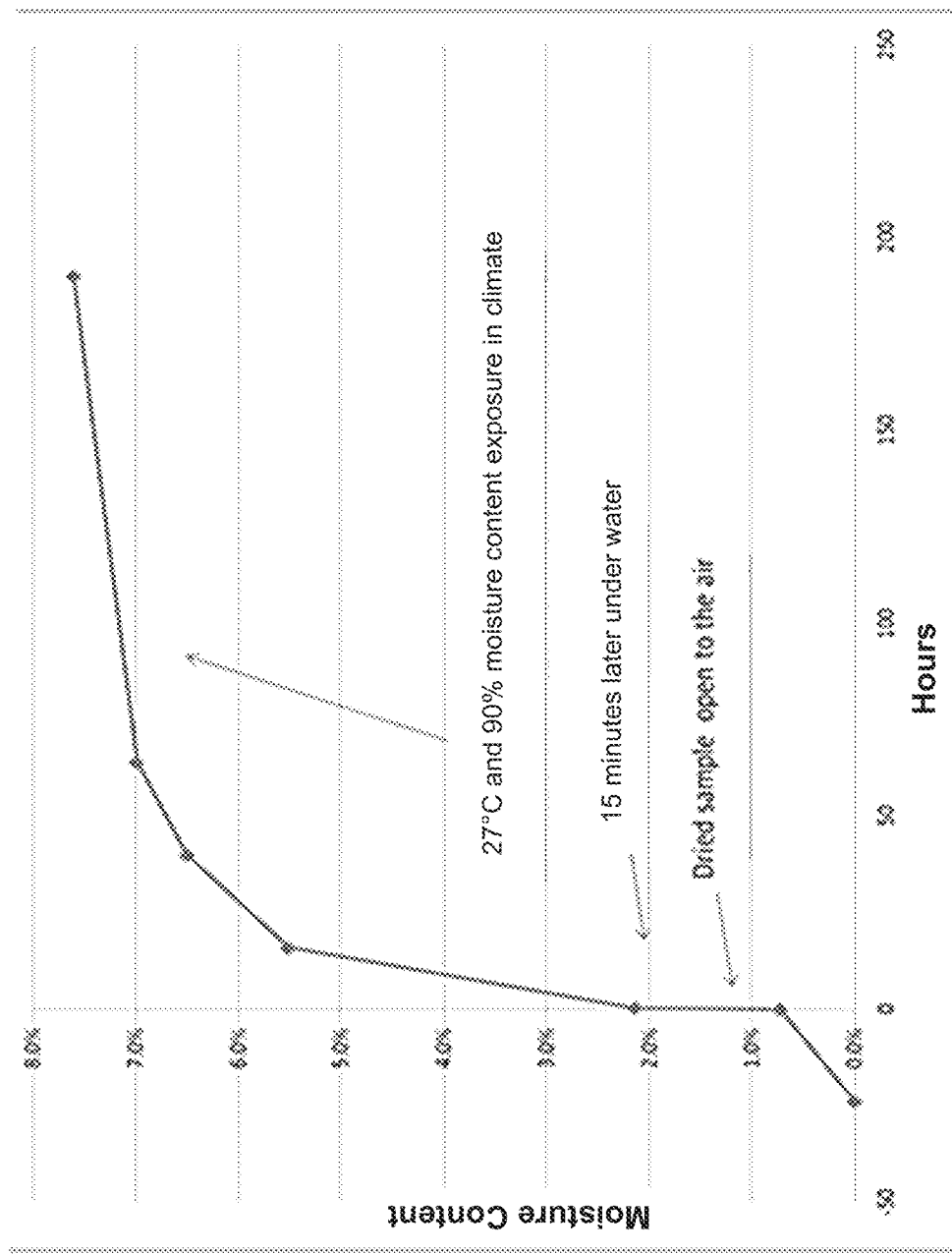
FIG. 18 shows the results of another test of a product of the invention in an artificial climate chamber.
Figure 19:
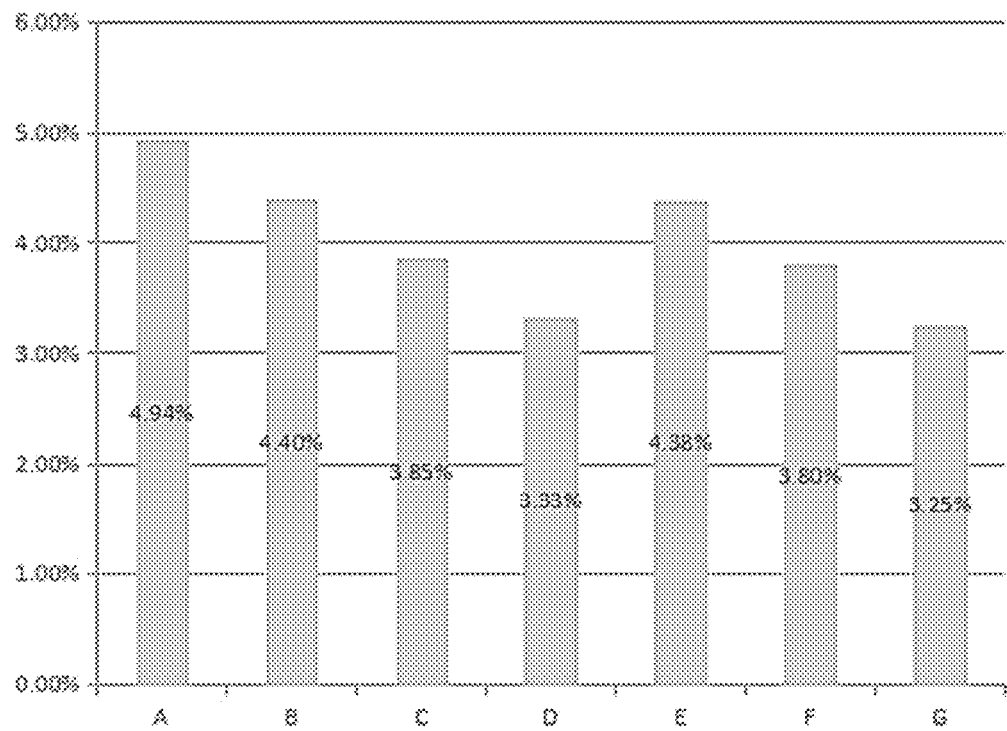
FIG. 19 shows the results of another test of a product of the invention in an artificial climate chamber.

In a second experiment in the climatic chamber, the biomass solid fuel was immersed in water for 15 minutes at a temperature of 27° C. and exposed to the climatic chamber. After immersion in water, the moisture content of the sample was 90% by weight. After 10 days of exposure in the climate chamber, the moisture content of the fuel stabilized at around 7.6%. The results are shown in FIGS. 18 and 19. Immersion of the particles had no effect on the equilibrium moisture content achieved after 10 days.

Example 9

The climatic chamber experiments were repeated for the products of Examples 1 to 7.

Figure 20:
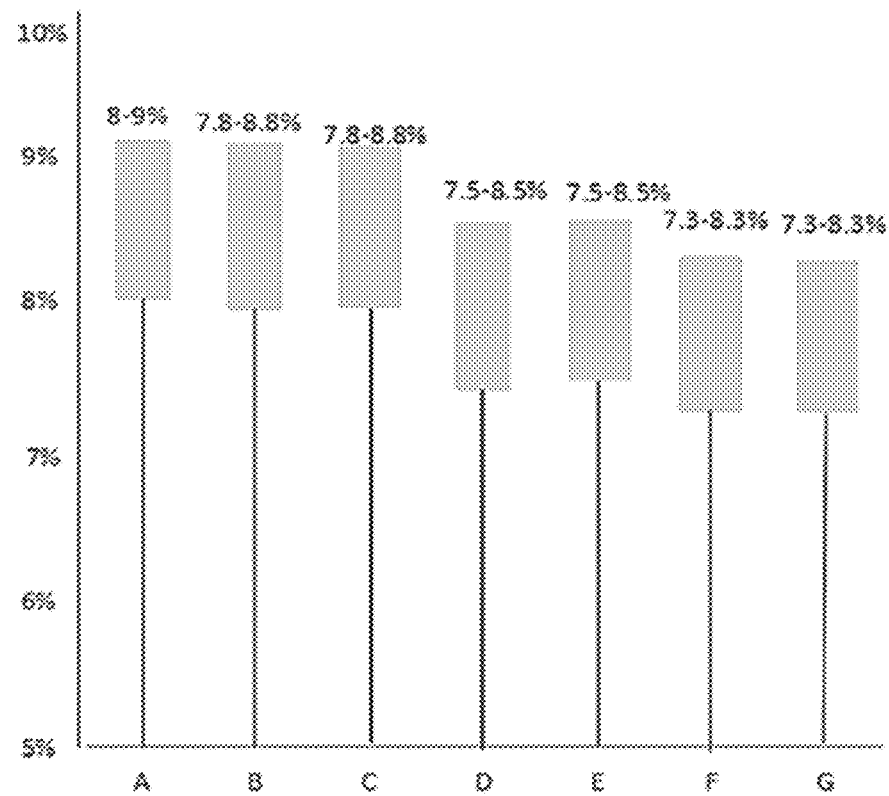
FIG. 20 shows the results of the surface moisture content of several products of the invention after testing in a climate chamber.

FIG. 20 shows the surface moisture content of the products of Examples 1 to 7. It can be seen that the surface moisture and actual moisture content of the biomass particles are very similar.

In FIGS. 17 to 20, the value on the y-axis is the weight percent of moisture in the biomass particles.

The invention claimed is:

1. A process for producing a solid biomass fuel, wherein the process comprises the following steps:
    (i) providing one or more biomass powders having a particle size of from 1000 μm to 10000 μm;
    (ii) heating the one or more biomass powders to a temperature of from 160° C. to 420° C. for a period of from 0.25 to 5 hours to provide a heated biomass product; and
    (iii) molding the heated biomass product to provide a solid biomass fuel, wherein heating the one or more biomass powders includes heating the one or more biomass powders under conditions so as to induce torrefaction of the molded biomass product;
    wherein the one or more biomass powders are derived from one or more sources of biomass, wherein the one or more sources of biomass: (i) consist of or consist essentially of rice husks; (ii) comprise or consist essentially of a mixture of rice husks and wood; (iii) consist of or consist essentially of a mixture of rice husks and calliandra callothyrsus; or (iv) comprise rice husks in an amount of at least 15% by weight, and calliandra callothyrsus; and wherein if the one or more sources of biomass consists or consists essentially of rice husks, material derived from biomass is present in the solid biomass fuel in an amount of at least 95% by weight of the total fuel content of the solid biomass fuel.

2. A process according to claim 1, wherein the one or more sources of biomass consist of or consist essentially of rice husk.

3. A process for producing a solid biomass fuel, wherein the process comprises the following steps:
    (i) providing one or more biomass powders having a particle size of from 1000 μm to 10000 μm;
    (ii) heating the one or more biomass powders to a temperature of from 160° C. to 420° C. for a period of from 0.25 to 5 hours to provide a heated biomass product; and
    (iii) molding the heated biomass product to provide a solid biomass fuel;
    wherein the one or more biomass powders are derived from one or more sources of biomass, wherein the one or more sources of biomass: (i) consist of or consist essentially of rice husks; (ii) comprise or consist essentially of a mixture of rice husks and wood; (iii) consist of or consist essentially of a mixture of rice husks and calliandra callothyrsus; or (iv) comprise rice husks in an amount of at least 15% by weight, and calliandra callothyrsus; and wherein if the one or more sources of biomass consists or consists essentially of rice husks, material derived from biomass is present in the solid biomass fuel in an amount of at least 95% by weight of the total fuel content of the solid biomass fuel, and wherein the one or more sources of biomass further comprise wood, calliandra callothyrsus, or a combination thereof.

4. A process according to claim 1, wherein the one or more sources of biomass comprise (i) rice husk and calliandra callothyrsus, or (ii) rice husk and wood.

5. A process according to any one of claim 1, wherein the one or more sources of biomass comprise rice husk in an amount of from 20% to 80% by weight.

6. A process according to any one of claim 1, wherein the one or more sources of biomass comprise rice husk in an amount of from 20% to 80% by weight, and wood in an amount of from 20% to 80% by weight.

7. A process according to any one of claim 1, wherein the one or more sources of biomass comprise rice husk in an amount of from 20% to 80% by weight, and calliandra callothyrsus in an amount of from 20% to 80% by weight.

8. A process according to claim 1, wherein step (ii) of heating the one or more biomass powders is carried out for a time period of from 0.5 to 3 hours, and/or wherein the step of heating the one or more biomass powders comprises heating the one or more biomass powders to a temperature of from 180° C. to 350° C.

9. A process according to claim 1, wherein the process further comprises cooling the heated biomass product prior to step (iii) of molding the heated biomass product.

10. A process according to claim 1, wherein step (i) of providing one or more biomass powders comprises pulverising one or more sources of biomass, and/or mixing the one or more biomass powders.

11. A process according to claim 1, wherein step (iii) of molding the heated biomass product comprises adapting the molding step such that that density of the solid biomass fuel is controlled.

12. A process according to claim 1, wherein an additive is added to the heated biomass product prior to step (iii) of molding the heated biomass product.

13. A process for producing a solid biomass fuel, wherein the process comprises the following steps:
(i) providing one or more biomass powders having a particle size of from 1000 μm to 10000 μm;
(ii) heating the one or more biomass powders to a temperature of from 160° C. to 420° C. for a period of from 0.25 to 5 hours to provide a heated biomass product; and
(iii) molding the heated biomass product to provide a solid biomass fuel;
wherein the one or more biomass powders are derived from one or more sources of biomass, wherein the one or more sources of biomass: (i) consist of or consist essentially of rice husks; (ii) comprise or consist essentially of a mixture of rice husks and wood; (iii) consist of or consist essentially of a mixture of rice husks and calliandra callothyrsus; or (iv) comprise rice husks in an amount of at least 15% by weight, and calliandra callothyrsus; and wherein if the one or more sources of biomass consists or consists essentially of rice husks, material derived from biomass is present in the solid biomass fuel in an amount of at least 95% by weight of the total fuel content of the solid biomass fuel, and
wherein step (ii) of heating the one or more biomass powders is adapted so as to control the uniformity of the heated biomass product, wherein adapting step (ii) so as to control the uniformity of the heated biomass product comprises conducting step (ii) in an apparatus in which the one or more biomass powders are rotated while being heated, wherein adapting step (ii) so as to control the uniformity of the heated biomass product comprises controlling the speed or direction of rotation of the one or more biomass powders, wherein the one or more biomass powders are rotated in the apparatus in both an anticlockwise and clockwise direction.

14. A process according to claim 1, wherein the bulk density of the solid biomass fuel as determined according to DIN EN 15103 is from 0.40 kg/l to 0.65 kg/l, and/or wherein the mechanical durability of the solid biomass fuel as determined according to DIN EN 15210-1 is 95% or more.

15. A process according to claim 1, wherein:
(i) the one or more sources of biomass comprise or consist essentially of rice husks, and wherein the solid biomass fuel has a bulk density of from 0.40 kg/L to 0.48 kg/L, and wherein the mechanical durability of the solid biomass fuel is 95% or higher;
(ii) the one or more sources of biomass comprise a mixture of rice husks and wood, wherein the solid biomass fuel has a bulk density of from 0.50 kg/L to 0.65 kg/L, and wherein the mechanical durability of the solid biomass fuel is 95% or more;
(iii) the one or more sources of biomass comprise a mixture of rice husks and calliandra callothyrsus, and wherein the solid biomass fuel has a bulk density of from 0.45 kg/L to 0.60 kg/L, and wherein the mechanical durability of the solid biomass fuel is 95% or higher;
wherein the bulk density is determined according to DIN EN 15103, and wherein the mechanical durability is determined according to DIN EN 15210-1.

16. A process according to claim 1, wherein (i) the total dry sulphur content of the biomass solid fuel is 0.05 wt % or less, wherein the total dry sulphur content is determined according to DIN EN 15289; (ii) the total dry hydrogen content of the biomass solid fuel is 5 wt % or more, wherein the total dry hydrogen content is determined according to DIN EN 15104; (iii) the total dry oxygen content of the biomass solid fuel is 34 wt % or more, wherein the total dry oxygen content is determined according to DIN EN 15296; (iv) the total dry carbon content of the biomass solid fuel is 40 wt % or more, wherein total dry carbon content is determined according to DIN EN 15104; and/or (v) the total dry nitrogen content of the biomass solid fuel is less than 0.5 wt %, wherein the total dry nitrogen content is determined according to DIN EN 15104.

17. A process according to claim 1, wherein (i) the chemical oxygen demand (COD) of the solid biomass fuel when immersed in water is 5000 ppm or less, wherein the chemical oxygen demand is determined according to GB/11914-89; (ii) the fixed carbon content of the solid biomass fuel is 28 wt % or more, wherein the fixed carbon content is determined according to DIN EN 51734; (iii) the ash content of the solid biomass fuel is less than 25 wt %, wherein the ash content is determined according to EN 14775 at 550° C.; and/or (iv) the volatile matter content of the solid biomass fuel is from 40 wt % to 65 wt %, wherein the volatile matter content is determined according to DIN EN 15148.

18. A process according to claim 1, wherein the process does not comprise adding coal, an oxidiser, an igniter, or any combination thereof to the heated biomass product prior to the molding step, and wherein the solid biomass fuel does not comprise coal, an oxidiser, an igniter, or any combination thereof.

19. A process according to claim 1, wherein step (ii) of heating the one or more biomass powders comprises heating the one or more biomass powders for a time period of from 30 minutes to 5 hours.

* * * * *